United States Patent
Alasaarela

(10) Patent No.: US 12,484,776 B2
(45) Date of Patent: Dec. 2, 2025

(54) OPHTHALMIC IMAGING INSTRUMENT AND OPHTHALMIC IMAGING METHOD

(71) Applicant: Optomed Plc, Oulu (FI)

(72) Inventor: Ilkka Alasaarela, Oulu (FI)

(73) Assignee: Optomed Plc, Oulu (FI)

( * ) Notice: Subject to any disclaimer, the term of this patent is extended or adjusted under 35 U.S.C. 154(b) by 315 days.

(21) Appl. No.: 18/475,124

(22) Filed: Sep. 26, 2023

(65) Prior Publication Data
US 2024/0099580 A1   Mar. 28, 2024

(30) Foreign Application Priority Data
Sep. 27, 2022   (FI) ..................................... 20225842

(51) Int. Cl.
*A61B 3/12* (2006.01)
*A61B 3/00* (2006.01)
*A61B 3/117* (2006.01)
*A61B 3/14* (2006.01)

(52) U.S. Cl.
CPC .............. *A61B 3/12* (2013.01); *A61B 3/0025* (2013.01); *A61B 3/117* (2013.01); *A61B 3/14* (2013.01); *A61B 2560/02* (2013.01); *A61B 2560/04* (2013.01)

(58) Field of Classification Search
CPC ......... A61B 3/0025; A61B 3/117; A61B 3/12; A61B 3/14; A61B 2560/02; A61B 2560/04
See application file for complete search history.

(56) References Cited

U.S. PATENT DOCUMENTS

| | | |
|---|---|---|
| 2007/0030450 A1 | 2/2007 | Liang et al. |
| 2010/0097573 A1 | 4/2010 | Verdooner et al. |
| 2016/0302665 A1 | 10/2016 | Swedish et al. |
| 2018/0220888 A1 | 8/2018 | Tumlinson et al. |
| 2019/0125184 A1 | 5/2019 | Kramer et al. |

FOREIGN PATENT DOCUMENTS

| | | |
|---|---|---|
| WO | 2021086522 A1 | 5/2021 |
| WO | 2022117646 A1 | 6/2022 |

OTHER PUBLICATIONS

Finnish Search Report for FI 20225842 dated Dec. 23, 2022, 2 pages.

*Primary Examiner* — Jack Dinh
(74) *Attorney, Agent, or Firm* — Nixon & Vanderhye PC

(57) ABSTRACT

An ophthalmic apparatus comprises a visible light illumination channel, which illuminates a retina of an eye of a patient under examination by visible light. A near-infrared illumination channel illuminates the retina of the eye of the patient under examination by near-infrared light. An imaging channel receives light from the retina of the eye illuminated by the visible light and/or the near-infrared light. A target channel outputs fixation image content to a patient whose eye is under the examination for fixation of a gaze direction of the patient. An alignment arrangement illuminates the anterior part of the eye and reflections therefrom are received by two of a fundus camera sensor and a first and second pupil camera sensors. A data processing unit determines an optimal positional alignment of the eye for imaging a fundus of the eye by a fundus camera sensor based on still image and/or video capture of the anterior part of the eye.

10 Claims, 14 Drawing Sheets

Components of imaging channel

Imaging channel

Components of imaging channel

Visual illumination channel

Visual illumination channel and imaging channel

Visual illumination beam and imaging beam within eye

Cross-sections of visual illumination and imaging beams

NIR illumination channel

NIR illumination, visual illumination and imaging channels

PDAF imaging channel

Close-up of PDAF channel

Cross section of imaging channel at aperture stop

PDAF illumination channel

Alignment illumination channel

Alternative of cornea alignment

Target channel

Alternative of target channel

Target channel, imaging channel and PDAF channel

Pupil illumination channel

Pupil camera channel

Alternative of pupil camera channel

Two pupil camera channels

Iris spot z-aid illumination channel

Iris with two spots

Cornea spot z-aid illumination channel

Posterior spot z-aid illumination channel

Cornea spot light z-aid channel and posterior spot illumination channel

Variant of pupil camera channel

OPHTHALMIC IMAGING INSTRUMENT AND OPHTHALMIC IMAGING METHOD

CROSS-REFERENCE TO RELATED APPLICATION

This application claims priority to FI 20225842 filed Sep. 27, 2022, the entire contents of which are hereby incorporated by reference.

FIELD

The invention relates to an ophthalmic imaging instrument and an ophthalmic imaging method.

BACKGROUND

Optical performance of the ophthalmic imaging instrument such as a fundus camera is based on several features which include field-of-view, image quality such as resolution, brightness, image noise reduction, image uniform reduction of reflection artifacts (from the lenses and/or eye), for example. The optical performance of the fundus camera may also depend also on need for a beamsplitter such as polarization beamsplitter for separating the illumination and imaging beams from each other. Additionally, precise alignment with the eye(s) and effective focusing are also required for images of good quality. Furthermore, the fundus camera should be compact enough with balanced weight while simultaneously the fundus camera should be cost-efficiently manufacturable to mention some of the challenges. There is thus room to improve the fundus camera.

BRIEF DESCRIPTION

The present invention seeks to provide an improvement in the measurements.

The invention is defined by the independent claims. Embodiments are defined in the dependent claims.

If one or more of the embodiments is considered not to fall under the scope of the independent claims, such an embodiment is or such embodiments are still useful for understanding features of the invention.

LIST OF DRAWINGS

Example embodiments of the present invention are described below, by way of example only, with reference to the accompanying drawings, in which FIG. 1 illustrates an example of an ophthalmic instrument in front of an eye;

DESCRIPTION OF EMBODIMENTS

Figure 1:
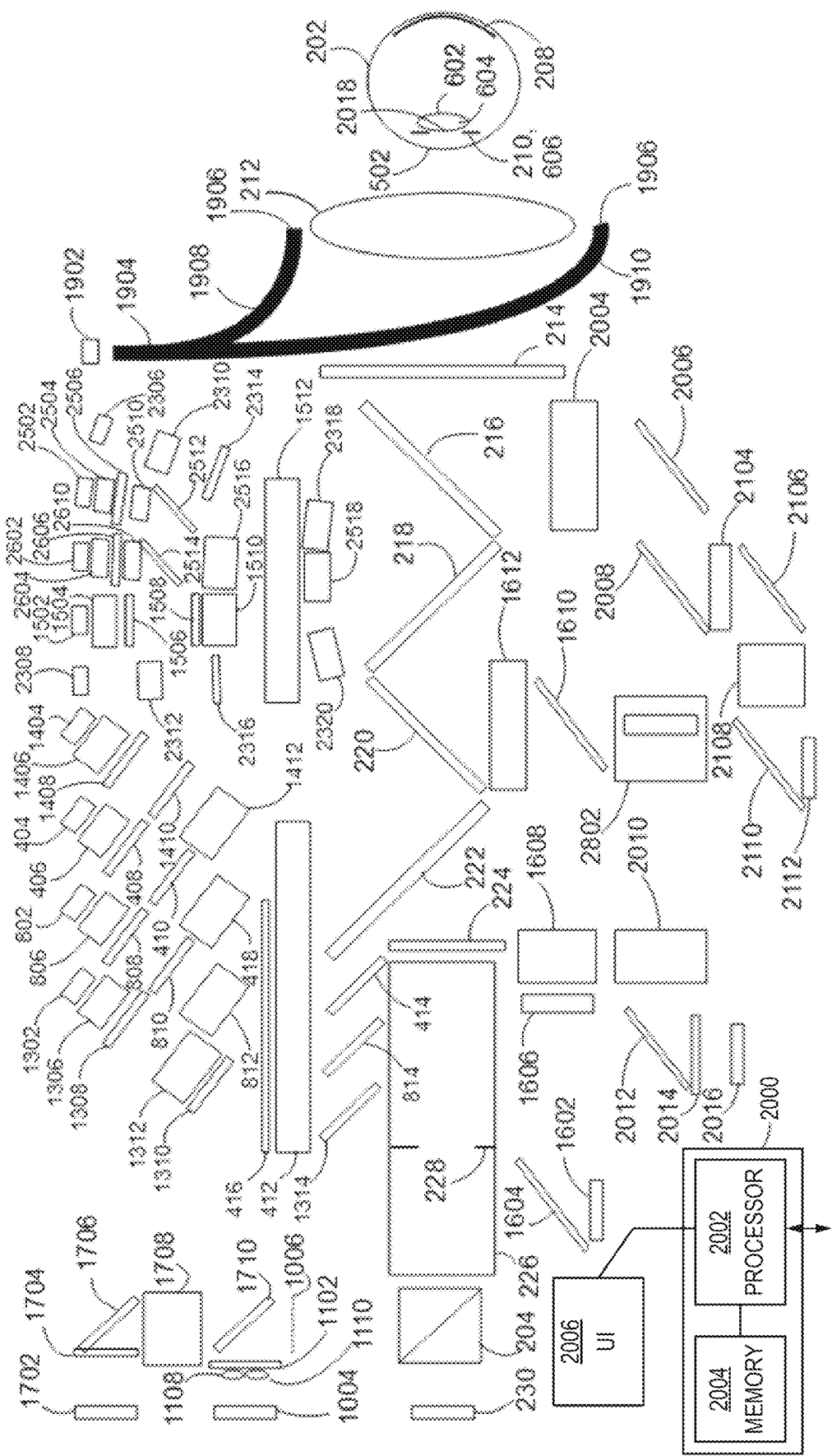

The following embodiments are only examples. Although the specification may refer to "an" embodiment in several locations, this does not necessarily mean that each such reference is to the same embodiment(s), or that the feature only applies to a single embodiment.

The articles "a" and "an" give a general sense of entities, structures, components, compositions, operations, functions, connections or the like in this document, Note also that singular terms may include pluralities.

Single features of different embodiments may also be combined to provide other embodiments. Furthermore, words "comprising" and "including" should be understood as not limiting the described embodiments to consist of only those features that have been mentioned and such embodiments may also contain features/structures that have not been specifically mentioned. All combinations of the embodiments are considered possible if their combination does not lead to structural or logical contradiction.

The term "about" means that quantities or any numeric values are not exact and typically need not be exact. The reason may be tolerance, resolution, measurement error, rounding off or the like, or a fact that the feature of the solution in this document only requires that the quantity or numeric value is approximately that large. A certain tolerance is always included in real life quantities and numeric values.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

The term "comprise" and grammatical variations thereof) and the term "include" should be read as "comprise without limitation" and "include without limitation", respectively.

"Lens" means a single lens, compound lens or set of lenses. For example, an achromatic doublet is a lens. Lenses may also be replaced by one or more curved mirrors with similar focal lengths. Instead of having only refractive or reflective surfaces, a lens or a mirror may also contain surfaces with diffractive optics structures forming the needed optical power.

The term "or" is inclusive, not exclusive.

In this application, the term "determine" in its various grammatical forms may mean calculating, computing, data processing for deriving a result, looking up in a database or the like. As a result, "determine" may also mean select, choose or the like.

An ophthalmic imaging instrument like a fundus camera based on considerations in Background is described hereafter.

In order to describe the operation of the fundus camera, the optical system are considered to have "optical channels", such as "VIS illumination channel" and an "optical imaging channel", for example, whose operation is described separately. As it will be described later, the different channels are not necessarily fully separate from each other, but they may share components and lights of different channels may occupy at least partially a same volume.

A fundus camera may not necessarily comprise all the described channels, but may comprise only such channels, which are needed for fulfilling the requirements of the fundus camera needed for the examination purpose in question.

Also, some alternative channels are presented for a same, partially the same, similar or corresponding function. An example of this is a cornea spot z-aid illumination channel and a cornea xyz-aid illumination channel, where xyz refers to the three dimensions of space. The used channel can be selected according to how it fits to the requirements of the of the fundus camera in question. Typically the selection is based on optimization i.e. a certain selection works more effectively than some other selection under certain restrictions.

Some modifications to the presented channels may be done when some channels are not used. An example of this are beamsplitters which may not be needed for a beam splitting purpose and they may then be replaced by fold mirrors and vice versa. When some of the described channels are not used, some of the components, such as beamsplitters, filters, or fold mirrors, of the used channels may not be needed and so may be removed.

In the description below, the term beamsplitter refer to a dichroic beamsplitter, a non-polarizing beamsplitter or a polarizing beamsplitter, for example, depending on the used wavelength bands configuration as described later in the description.

The ophthalmic instrument may also comprise a data processing unit 2000 which, in turn, comprises one or more processors 2002 and one or more memories 2004 including computer program code. The one or more memories 2004 and the computer program code are configured to, with the one or more processors 2002, cause ophthalmic instrument to perform one or more method steps described in this document. The method steps are related to reception of information on the eye, presenting alignment information to the patient and/or to personnel, processing the information on the eye, and controlling the ophthalmic instrument based on the information on the eye.

The term "computer" includes a computational device that performs logical and arithmetic operations. For example, a "computer" may comprise an electronic computational device, such as an integrated circuit, a microprocessor, a mobile computing device, a laptop computer, a tablet computer, a personal computer, or a mainframe computer. A "computer" may comprise a central processing unit, an ALU (arithmetic logic unit), a memory unit, and a control unit that controls actions of other components of the computer so that steps of a computer program are executed in a desired sequence. A "computer" may also include at least one peripheral unit that may include an auxiliary memory (such as a disk drive or flash memory), and/or may include data processing circuitry.

A user interface 2006 means an input/output device and/or unit. It is operationally connected with the data processing unit 2000. Non-limiting examples of a user interface 2006 include a touch screen, other electronic display screen, keyboard, mouse, microphone, handheld electronic controller, digital stylus, display screen, speaker, and/or projector for projecting a visual display. A person skilled in the art is familiar with the user interfaces, per se.

FIG. 1 depicts optics of an embodiment of the fundus camera in front of the eye under examination. The optical system is next described in more detail channel by channel.

The ophthalmic apparatus can be described shortly as follows, The ophthalmic apparatus comprises a visible light illumination channel 12, which illuminates a retina 208 of an eye 202 of a patient under examination by visible light, and/or a near-infrared illumination channel 14, which is configured to illuminate the retina 208 of the eye 202 of the patient under examination by near-infrared light.

The ophthalmic apparatus comprises an imaging channel 10, which is configured to receive light from the retina 208 of the eye 202 illuminated by the visible light and/or the near-infrared light.

The ophthalmic apparatus comprises a target channel 22A, 22B, which is configured to output fixation image content to a patient whose eye 202 is under the examination for fixation of a gaze direction of the patient.

The ophthalmic apparatus comprises a fundus camera sensor 204.

At least one of the following illumination alignment arrangement of the ophthalmic apparatus is associated with a cornea 502: a cornea spot illumination z-aid channel 30 configured to generate near-infrared alignment beams directed to the cornea 502, and a cornea xyz alignment arrangement 20A configured to generate cornea xyz-aid illumination beams 1402 of infrared light, the cornea xyz alignment arrangement 20A being an operational pair with the fundus camera sensor 204 that is configured to capture at least one still image and/or video of the cornea 502 under illumination of infrared light of the cornea xyz alignment arrangement 20A.

At least one of the following illumination alignment arrangement of the ophthalmic apparatus is associated with the anterior part of the eye 202: an iris spot z-aid illumination channel 28, which is configured to generate near-infrared alignment beams directed to the iris 606, and a posterior spot z-aid illumination channel 32, which is configured to generate near-infrared alignment beams directed to a posterior surface 602 of the crystalline lens 604.

The ophthalmic apparatus comprises at least one of the following camera channel arrangements: a first pupil camera channel 26A, which is configured to convey light from the anterior part of the eye 202 for capturing of at least one still image and/or video by a first pupil camera sensor 2016, and a second pupil camera channel 26B for image capturing of the anterior part of the eye 202 by a second pupil camera sensor 2112.

The ophthalmic apparatus comprises a data processing unit 2000, which is configured to determine an optimal positional alignment of the eye 202 for imaging a fundus of the eye 202 by the fundus camera sensor 204 based on the at least one still image and/or video of the cornea 502 and at least one of the following captured by either of the first or second pupil camera sensor 2016, 2112: the iris 606 and the posterior surface 602 of the crystalline lens 604 with the alignment beams thereon.

As an advantage, the optimal working distance to the eye 202 may be determined by using at least two separate feature of the eye 202 under examination: the cornea 502 and the posterior surface 602 of the crystalline lens 604, or the cornea 502 and the iris 606. By using the at least two Matures, the individual variations in eye geometry between the patients may be taken account 5 more accurately in determination of the optimal working distance, which allows imaging fundus 208 of the eye 202 with better image quality and with minimal amount of reflection artifacts.

Imaging Channel

Figure 2:
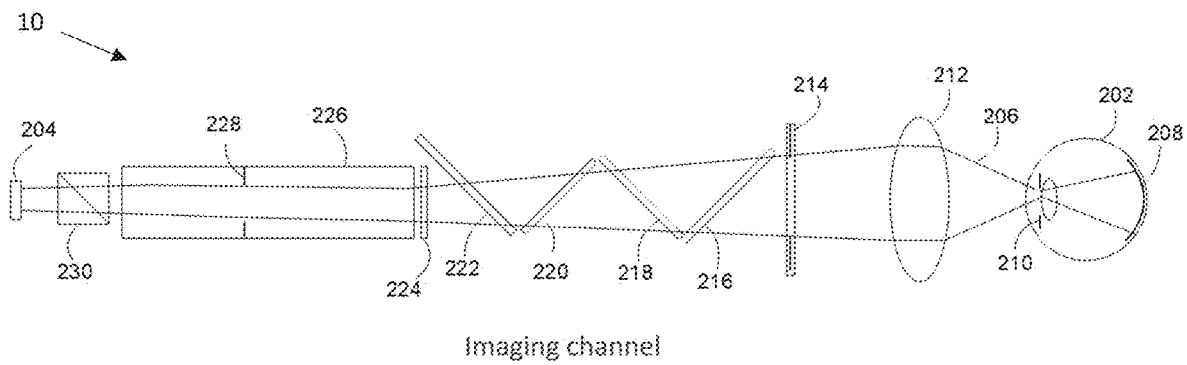
FIG. 2 illustrates an example of an imaging channel with an eye under examination.

FIG. 2 shows the imaging channel 10 of the fundus camera, together with an eye 202 which is under examination. The imaging channel 10 is used for receiving light from the eye 202. That may mean capturing still images or video from the retina 208 of the eye 202. The retina 208 is illuminated by an illumination channel 12, 14 such as the VIS (visible light, about 380 nm to about 720 nm) or NIR (near infrared) illumination channels as described later, and the reflected rays from the retina 208 are collected and conveyed by the imaging channel 10 optical components so that the image of the retina 208 is formed on a fundus camera sensor 204. So, the imaging beam 206 originates from the retina 208, transmits through the pupil 210 of the eye 202 to the objective lens 212, after which the beam passes through the intermediate image aperture 214, the first, second, third and fourth beamsplitters 216, 218, 220, 222, the post-polarizer 224, the camera lens module 226 comprising a multitude of lenses and an aperture stop 228, a fifth beamsplitter 230 and finally arrives at the fundus camera sensor 204.

The objective lens 212 forms an image of the retina 208 at or close to the intermediate image aperture 214, from which the image is further imaged to the fundus camera sensor 204 by the camera lens module 226. The aperture stop 228 is imaged by the camera lens module 226 and the objective lens 212 close to the eye pupil 210 when the eye 202 is at the examination position, i.e. at the nominal eye position or at a normal working distance of the fundus camera.

The axial position of some of the lens elements of the camera tens module 226 may be adjustable by a motor in order to adjust the focus of the fundus camera. The focus adjustment range may be about −20 D to about +20 D, for example.

The objective lens 212 may have at least one aspheric surface. Such a surface may be the surface on the side of the fundus camera sensor 204 in a propagation direction of light, for example. Aspheric surface may also be the surface on the side of the eye 202, The both sides of the objective lens 212 may have aspheric form, as well.

Besides the shown components, the imaging channel may also comprise spectral filters, such as short pass filter, for example. The short pass filter may block light having a wavelength longer than 900 nm arriving at the fundus camera sensor 204. The filters may be positioned between the post-polarizer 224 and the fifth beamsplitter 230, for example.

Figure 3:
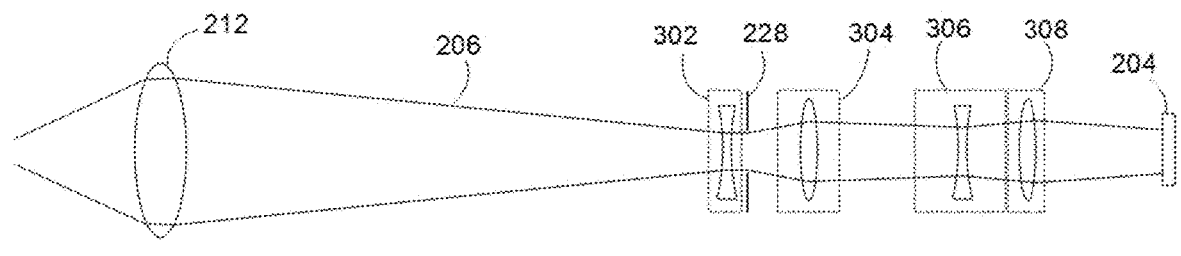
FIG. 3 illustrates an example of components of the imaging channel.

As depicted in FIG. 3, an embodiment of the imaging channel 10 optics may comprise the following in the direction from the eye 202 to the fundus camera sensor 204: an aspheric objective lens 212, a negative group 302 close to the aperture stop 228, a positive group 304, a negative group 306, and a positive group 308, and the fundus camera sensor 204. Lens groups 302, 304, 306, 308 may each contain at least one lens. Instead of the negative group 302, there may be positive group. There may be additional negative group between the objective lens 212 and the group 302. There may be additional positive group between the objective lens 212 and the group 302. There may be additional negative group between the group 308 and the sensor 204. Negative group refers to a group of lenses which has negative combined power, i.e. negative diopters and negative focal length. Positive group refers to a group of lenses which has positive combined power, i.e. positive diopters and positive focal length.

VIS Illumination Channel

Figure 4:
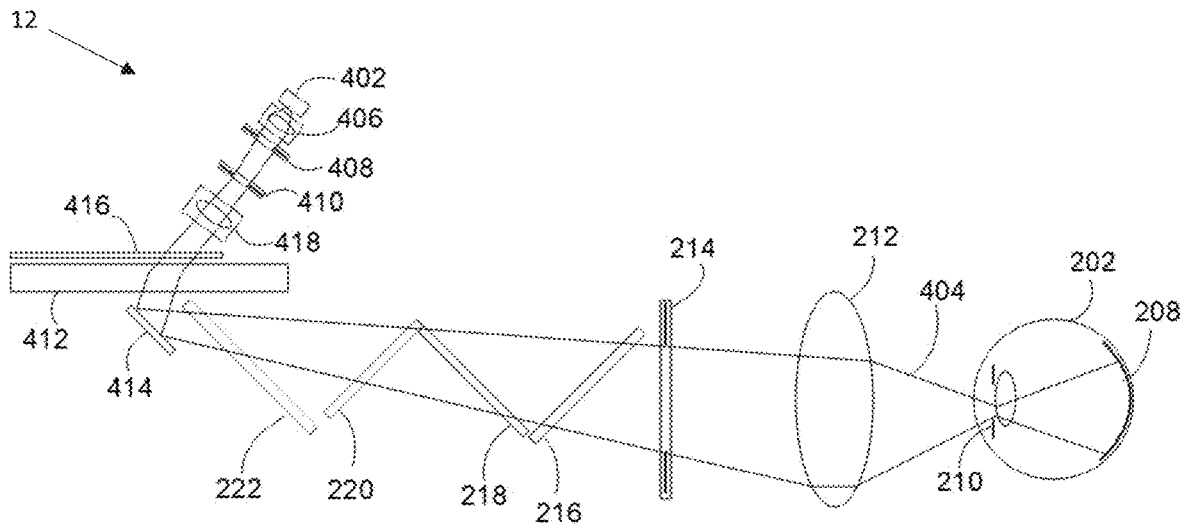
FIG. 4 illustrates an example of a visible light illumination channel that illuminates retina.

FIG. 4 shows the VIS illumination channel 12 (visible light illumination channel 12) which is used for illuminating the retina 208 with visible light. The LED 402 emits white light forming the VIS illumination beam 404, which is collected by a condenser optical arrangement 406, which may comprise one or more lenses, shaped by a field stop aperture 408 and a illumination aperture stop 410, and guided by a first relay optical arrangement 418, which may include one or more relay lenses, a first fold mirror 412, and a sixth beamsplitter 414, through the beamsplitters 222, 220, 218, and 216, through an intermediate image aperture 214, an objective lens 212 and the pupil of the eye 210, to the retina 208. The VIS illumination beam 404 may be polarized by using the pre-polarizer 416. The field stop aperture 408 is approximately imaged close to the intermediate image aperture 214 in order to suppress the stray light access towards the eye 202. The illumination aperture stop 410 is approximately imaged close to the eye pupil 210 when the eye 202 is at the nominal eye position.

The illumination aperture stop 410 may be shaped as crescent, ellipse rectangle or circle for example.

The VIS illumination beam 404 is folded next to the imaging channel 10 by the sixth beamsplitter 414. Between the sixth beamsplitter 414 and the eye 202, the VIS illumination beam 404 passes through the same components as the imaging beam 206.

In an embodiment, the beamsplitters 216, 218, 220 and 222 may be tilted. In this manner, a reflection of the VIS illumination beam 404 from the beamsplitters 216, 218, 220 and 222 directly to the imaging channel towards the fundus camera sensor 204 is limited or eliminated, which could otherwise cause image artifacts.

Figure 5:
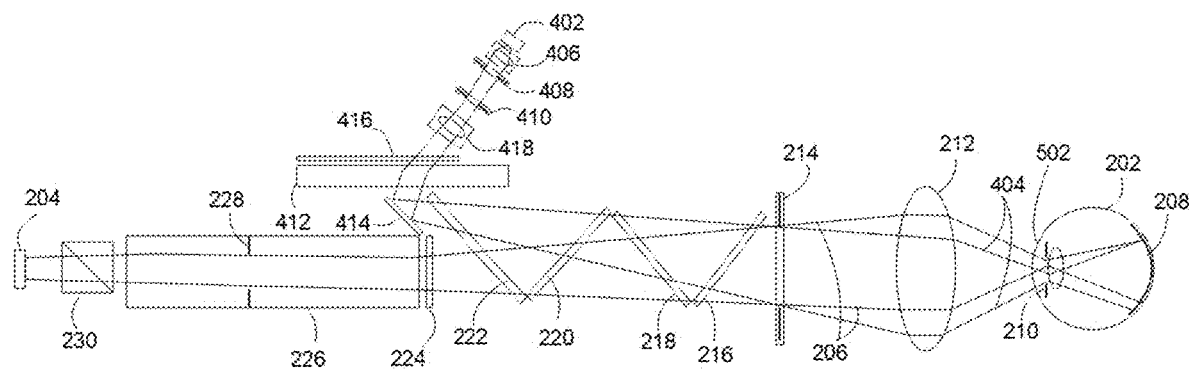
FIG. 5 illustrates an example of the visible light illumination channel and the imaging channel together.

FIG. 5 illustrates an example of the visible light illumination channel 12 and the imaging channel 10 together.

Use of Polarized Light

In an embodiment relating to visible light processing, the pre-polarizer 416 may be oriented with respect to the post-polarizer 224 so that the light which is reflected from the objective lens 212, cannot pass the post-polarizer 224, For example, both the pre-polarizer 416 and post-polarizer 224 can function as linear polarizers and be oriented so that the light reflected from the objective lens 212 is linearly polarized perpendicular to the transmission axis of the post-polarizer 224. In this manner, the light cannot pass the post-polarizer 224. This arrangement eliminates or suppresses reflection artifacts from the fundus image caused by reflections inside the fundus camera. The described use of polarization suppresses also the direct reflections from the cornea 502.

Pupil Separation and Guilstrand's Principle

Figure 6:
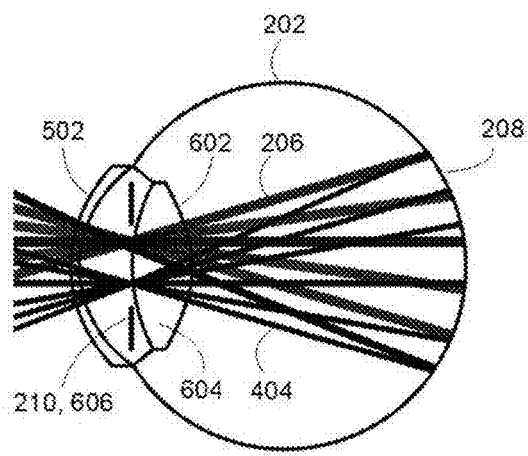
FIG. 6 illustrates an example of a visible light illumination beam and an imaging beam.

FIG. 6 shows side view of the VIS illumination beam 404 and the imaging beam 206 as they pass the eye pupil 210 at the nominal eye position. At the nominal eye position, the eye 202 is properly aligned with the fundus camera so that good quality images from the retina 208 can be captured. The eye pupil 210 is located on the plane where the iris 606 of the eye is approximately located. The VIS illumination beam 404 and the imaging beam 206 are separated approximately from the cornea 502 to the posterior surface 602 of the crystalline lens 604 based on the optical design of the fundus camera optical system. This, fulfils the Gullstrand's principle for avoiding the reflections form the eye anterior part that otherwise would cause image artifacts.

Figure 7:
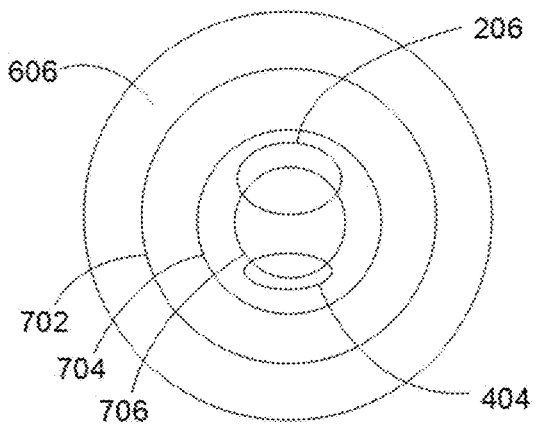
FIG. 7 illustrates an example of cross-sections of the visible light illumination beam and the imaging beam.

FIG. 7 shows the cross-sections of the VIS illumination beam 404 and the imaging beam 206 at the pupil 210 of the eye when the eye 202 is at its nominal position.

At the nominal eye position, the VIS illumination beam 404 and the imaging beam 206 are separated at the eye pupil 210. The cross-sections of the beams at the eye pupil 210 are approximately the images of the illumination aperture stop 410 and the aperture stop 228, We call this separation of the illumination beam 404 and the imaging beam 206 in the eye pupil 210 as "pupil separation".

Circle 702 represents the iris aperture when the eye 202 is diluted, i.e. having approximately 8 mm diameter. Circle 704 represents the iris aperture in dim room, having approximately 5 mm diameter, and circle 706 represents the iris aperture in a lighted room, having approximately 3 mm diameter. Portions of the VIS illumination beam 404 and the imaging beam 206 can pass through the iris aperture through 3 mm iris aperture diameter, which allows fundus imaging.

NIR Illumination Channel

Figure 8:
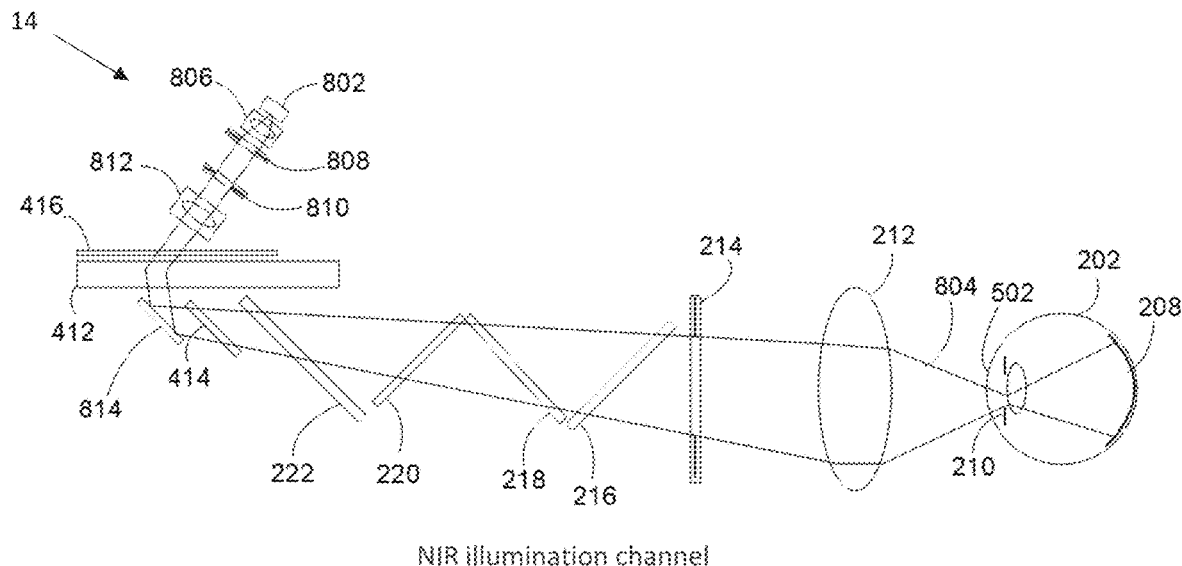
FIG. 8 illustrates an example of a near infrared illumination channel used for illuminating the retina.

FIG. 8 shows the NIR illumination channel 14 which is used for illuminating the retina 208 with near-infrared light. A LED 802 emits near-infrared light forming the NIR illumination beam 804, which is collected by the condenser optical arrangement 806 with one or more lenses, shaped by the field stop aperture 808 and the illumination aperture stop 810, and guided by a second relay optical arrangement 812 including one or more lenses, the first fold mirror 412, a seventh beamsplitter 1314, through the sixth beamsplitter 414 and the beam splitters 222, 220, 218 and 216, through the intermediate image aperture 214, the objective lens 212 and the pupil 210 of the eye 202, to the retina 208. In an embodiment, the NIR illumination beam 804 may be polarized by using the pre-polarizer 416, i.e. the reflections from the objective lens 212 and the cornea 502 may thus be suppressed similarly to that in the VIS illumination channel. The field stop aperture 808 is approximately imaged close to the intermediate image aperture 214 in order to suppress the stray light access towards the eye 202. The illumination aperture stop 810 is approximately imaged close to the eye pupil 210 when eye 202 is at the nominal eye position.

Figure 9:
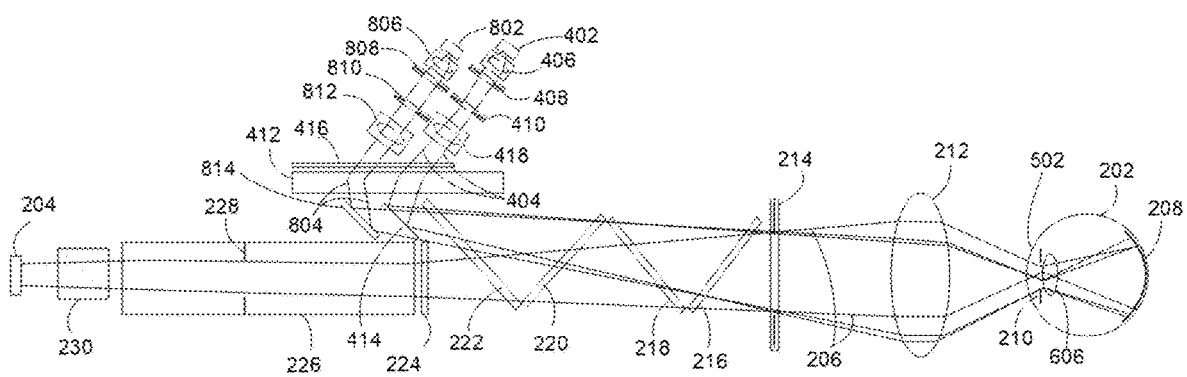
FIG. 9 illustrates an example of the near infrared illumination channel, the visible light illumination channel and the imaging channel.

FIG. 9 shows the NIR illumination channel 14 together with the VIS illumination channel and the imaging channel.

The LED 802 may for example emit light with dominant wavelength approximately between 830 and 860 nm, or between 930 and 960 nm, or between 770 and 830 nm.

The sixth beamsplitter 414 may be a dichroic beamsplitter reflecting visible light and transmitting near-infrared light.

The NIR illumination beam 804 may be used for capturing video of the retina 208 during aligning the fundus camera with the eye 202 as eye iris 606 does not contract when exposed to the near-infrared light.

On the eye pupil 210, the NIR illumination beam 804 may be approximately overlaid with the VIS illumination beam 404, and the both beams 804, 404 may be separated from the imaging beam 206 the same way from the cornea 502 through the crystalline lens 604 as explained before. The Gullstrand's principle can in this manner also be fulfilled with the near-infrared illumination.

Matching of the VIS and the NIR illumination beams 404, 1304 at the anterior part of the eye can be done with required precision as the illumination aperture stops 410 and 810 are separate components. This enables tolerating more lateral and axial color aberration from the objective lens 212, which benefits the system optical design and allows achieving better image quality. In an embodiment, the VIS and the NIR illumination beams 404, 804 are separated between the LEDs 402, 802 and the illumination aperture stops 410, 810. In that case, the VIS and the NIR illumination beams 404, 804 may have a common second relay optic arrangement 418, 812, and common beamsplitter 414, 814, which may simplify the optical structure.

The NIR illumination channel and the VIS illumination channel share the first fold mirror 412 and the pre-polarizer 416. In an embodiment, the LED 402 and LED 802 can be arranged to the same printed circuit board. Note, that instead of these shared components, separate components may also be used.

PDAF Imaging Channel

Figure 10:
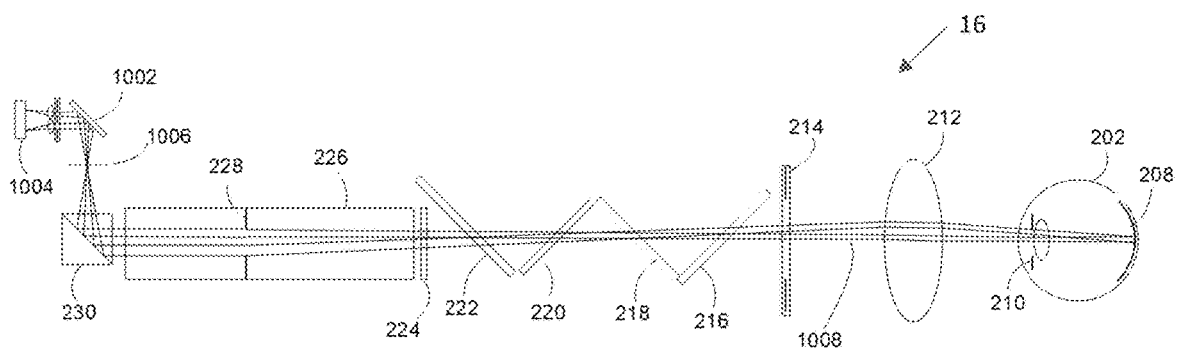
FIG. 10 illustrates an example of a phase detection auto-focus imaging channel for imaging the retina.

FIG. 10 presents the PDAF (phase detection auto-focus) imaging channel 16, which is used to measure suitable focus for the camera lens module 226 in order to obtain sharp images of the retina 208. Similar to the imaging channel 10, the light reflected from the retina 208 is captured by the objective lens 212, guided through the beamsplitters 216, 218, 220, 222 and the post-polarizer 224 to the camera lens module 226. The camera lens module 226 creates image of the retina 208. In this embodiment, instead of creating the image to the fundus camera sensor 204, the PDAF beam 1008 is reflected by the fifth beamsplitter 230 and a second fold mirror 1002 towards a PDAF sensor 1004. The image of the retina 208 is formed as the intermediate image 1006 in air between the fifth beamsplitter 230 and the second fold mirror 1002, from which the image is further imaged as two separate images to the PDAF sensor 1004.

Figure 11:
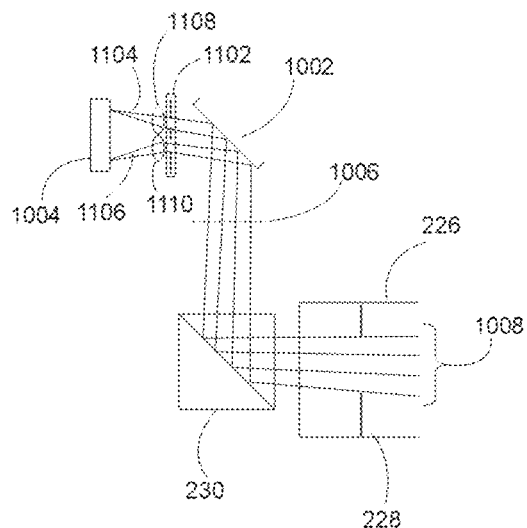
FIG. 11 illustrates an example of a close-up of the phase detection auto-focus imaging channel.
Figure 12:
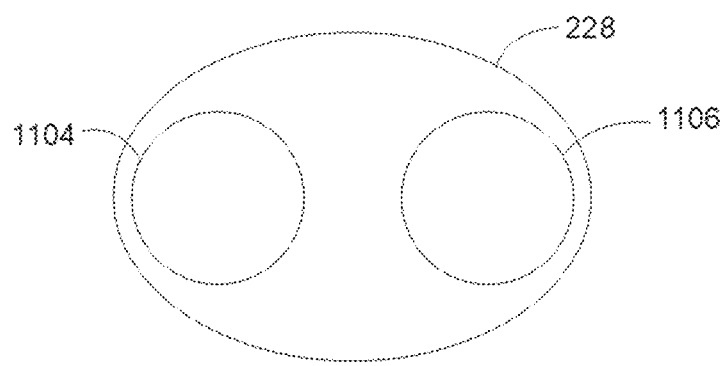
FIG. 12 illustrates an example of a cross-section of the imaging beam 5 at an aperture stop.

FIG. 11 shows a close-up image of the PDAF imaging channel 16 between the fifth beamsplitter 230 and the PDAF sensor 1004. The double aperture 1102 selects two distinct portions of the PDAF beam 1008 forming sub-beams 1104 and 1106. The double aperture 1102 may be arranged to be approximately at optical conjugate with the aperture stop 228. A pair of lenses 1108, 1110 are used to image the intermediate image 1006 to two distinct images close to the PDAF sensor 1004. The sub-beams 1104 and 1106 are arranged to arrive at the PDAF sensor 1004 in non-telecentric way. By this way, the mutual distance between the focused or non-focused images formed by the sub-beams 1104, 1106 on the PDAF sensor 1004 is dependent on accommodation of the eye 202 and the focus setting of the camera lens module 226. The distance can be analyzed from the PDAF sensor image and used for determining a suitable/desirable/optimal focus setting for the camera lens module 226.

In an embodiment, there may be an additional lens with positive optical power for example close to the intermediate image 1006 in order to focus the image of the aperture stop 228 better to the double aperture 1102.

FIG. 1.2 shows the aperture stop 228 with the cross-section of the imaging beam 206 and the cross-sections of the sub-beams 1104 and 1106 on the aperture stop 228.

The PDAF imaging channel may operate by using near-infrared light. The fifth beamsplitter 230 may be a dichroic beamsplitter which reflects the operating wavelength band of the PDAF imaging channel and transmits other wavelength bands arriving at the fundus camera sensor 204, such as visible and near-infrared bands used for fundus imaging or fundus camera alignment.

PDAF Illumination Channel

Figure 13:
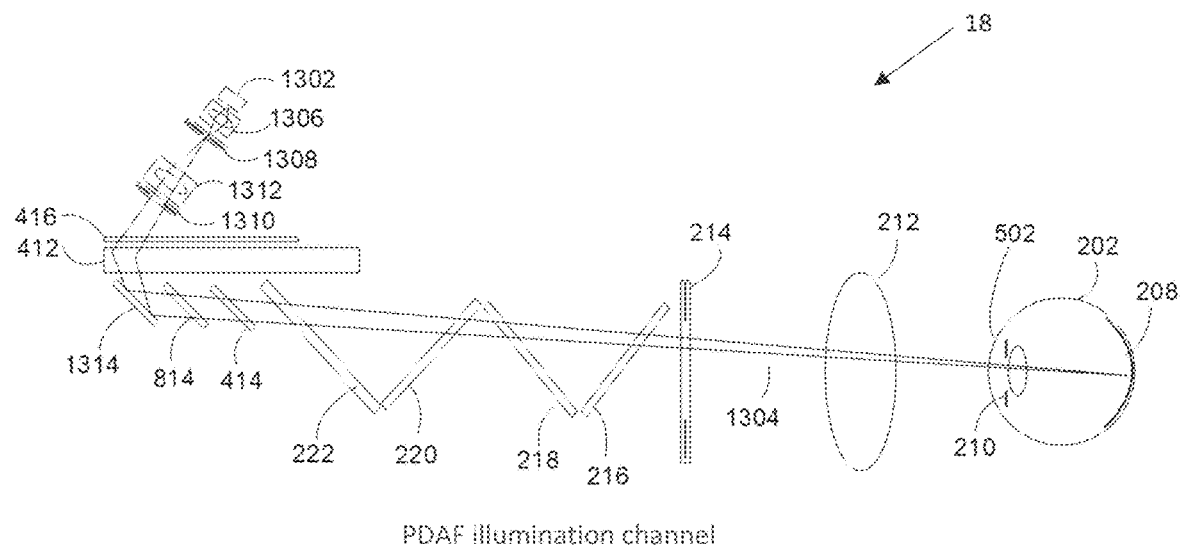
FIG. 13 illustrates an example of a phase detection auto-focus illumination channel.

FIG. 13 shows the PDAF illumination channel 18, which is used to form a target pattern on the retina 208 in the operating wavelength band of the PDAF imaging channel 16 in order to improve the operation of the PDAF imaging channel 16. The retina 208 of a typical eye 202 has low-contrast features when illuminated by uniform near-infrared light such as done by the NIR illumination channel, so the PDAF illumination channel 18 may be used to project a higher contrast pattern to the retina 208, such as a line, whose reflection from the retina 208 can then be collected and analyzed by the PDAF imaging channel 16.

A LED 1302 may emit near-infrared light forming the PDAF illumination beam 1304, The light is collected by the condenser optical arrangement 1306 including one or more lenses, shaped by the field stop aperture 1308 and the illumination aperture stop 1310, and guided by a third relay optical arrangement 1312 with one or more lenses, and the first fold mirror 412 and a third fold mirror 1304, through the beamsplitters 814, 414, 222, 220, 218, and 216, and the intermediate image aperture 214, the objective lens 212 and the pupil 210 of the eye, to the retina 208.

In an embodiment, the PDAF illumination beam 1304 may be polarized by using the pre-polarizer 416 for eliminating or suppressing the reflections from the objective lens 212 and the cornea 502 similarly to that of the VIS illumination channel.

The field stop aperture 1308 may form a shape of the pattern. The field stop aperture 1308 may be shaped as a slit for example for projecting a line pattern to the retina 208. The field stop aperture 1308 may alternatively be a circular hole for projecting a circular spot to the retina 208, The field stop aperture 1308 may also form an array or lines or spots.

The LED 1302 may emit light with dominating wavelength between about 770 and about 830 nm, for example, for the PDAF imaging beam 1304. The seventh dichroic beamsplitter 814 may transmit light in that band and reflect light in the wavelength used in the NIR illumination channel 14.

The LED 1302 may emit light with dominating wavelength between about 830 and about 860 nm, or between about 930 and about 960 nm, for example, in which case the transmission and reflection spectra of the dichroic beamsplitters are set accordingly.

The described PD-AF arrangement comprising the PDAF imaging channel 16 and the PDAF illumination channel 18 may provide a fast and robust focus determination, accurate focus information independent from the geometry of the eye 202, and/or minimize the need for extra calibrations during the use of the fundus camera.

Cornea xyz-Aid Illumination Channel

Figure 14:
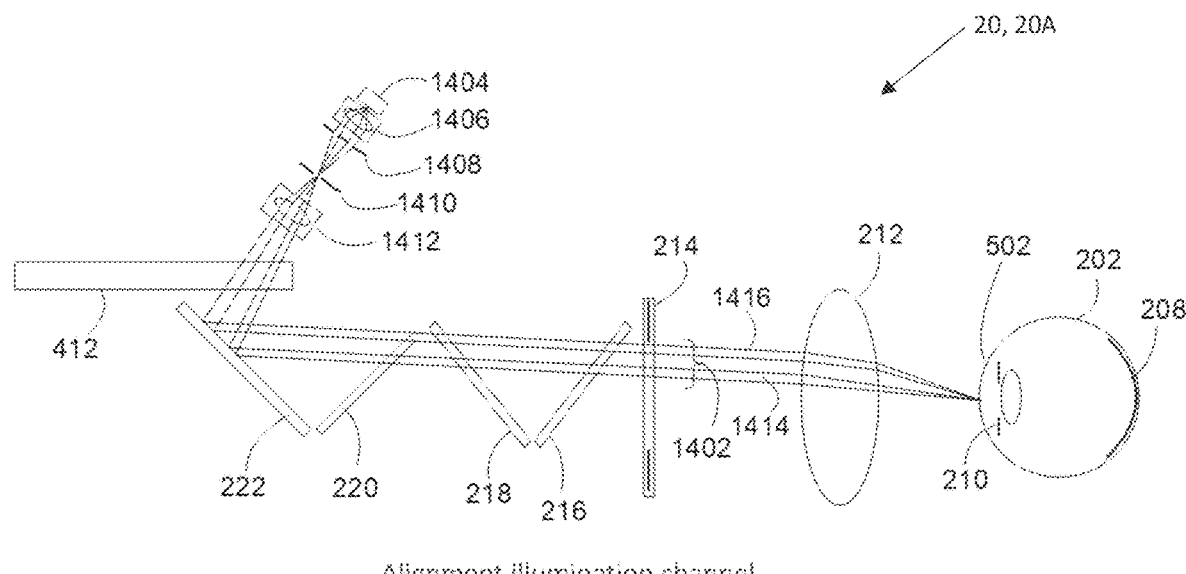
FIG. 14 illustrates an example of an alignment illumination channel, where alignment, can be performed three dimensionally in an xyz-coordinate system.

FIG. 14 shows an alignment channel illumination channel 20, which comprises a cornea xyz-aid illumination channel 20A. This channel generates the alignment beams, i.e., cornea xyz-aid illumination beams 1402, which are reflected from the cornea 502 and captured by the fundus camera sensor 204 and used for determining the optimal eye 202 positional alignment for the fundus imaging. When the optimal working distance between the eye and the ophthalmic apparatus has not been reached, the image of the cornea may be out-of-focus and/or obscure. A LED 1404 emits near-infrared light which forms the cornea xyz-aid illumination beams 1402, This illumination channel allows alignment three dimensionally i.e. in all x-, y- and z-dimensions.

The light is collected by a condenser optical arrangement 1406 with one or more lenses, shaped by a field stop aperture 1408 and an illumination aperture stop 1410, and guided by a fourth relay optical arrangement 1412 including one or more lenses, by reflections from the first fold mirror 412 and the fourth beamsplitter 222, through the beamsplitters 220, 218, and 216, the intermediate image aperture 214, and the objective lens 212 to the cornea 502 of the eye 202.

The cornea xyz-aid illumination beams 1402 may comprise two separate beams 1414, 1416, which cross each other on the cornea 502 when the eye 202 is at the nominal eye position. The beam 1414, 1416 may have an angle with respect to the optical axis between about 5° and about 25', for example, or for example between about 10' and about 20', with respect to the normal of the optical axis of the imaging channel 10 at the cornea 502. The propagation directions of the beams 1414 and 1416 arriving to the cornea 502 may have angular difference between about 10° and about 50°, or between about 20° deg and about 40', for example. The beams 1414, 1416 may have oblong cross-sections perpendicular to the propagation direction. The cross-sections may be wider in the direction perpendicular to the cross-sectional line between the cross-section plane and the plane containing the both propagation direction vectors. The illumination aperture stop 1410 may include one circular or elliptical hole, for example, and be approximately conjugate of the cornea 502, The field stop aperture 1408 may comprise two slits and be approximately conjugate of the angular domain between the cornea 502 and the objective lens 212.

A portion of the light of the cornea xyz-aid illumination beams 1402 reflected from the cornea 502 is captured by the objective lens 212 and guided by the imaging channel to the fundus camera sensor 204. The image on the fundus camera sensor 204 may be used to calculate the position of the eye 202 in respect to the fundus camera in order to help aligning the fundus camera to the eye 202. The image on the fundus camera sensor 204 formed by the cornea xyz-aid illumination beams 1402 reflected from the cornea 502 may be approximately the optical conjugate of the angular distribution of cornea reflected beams 1402, The image of the angular distribution may be out-of-focus and/or obscure. An example of the out-of-focus condition is when the position of the eye 202 differs from the optimal working distance.

The described cornea xyz-aid illumination channel 20, 20A, together with the imaging channel 10 and the fundus camera sensor 204, provide accurate information about a location of the cornea with respect to the fundus camera, and the information can be used for determination of optimal working distance. The location information can be provided accurately even with different cornea curvatures and/or shapes.

The LED 1404 may emit light with dominating wavelength between about 770 nm and about 830 nm, for example. In that case the fourth dichroic beamsplitter 222 may reflect light in that band and transmit light in the wavelengths used by the other channels passing the fourth beamsplitter 222.

The LED 1404 may emit light with dominating wavelength between about 830 and about 860 nm, or between about 930 and about 960 nm, for example, in which case the transmission and reflection spectra of the dichroic beamsplitters are set accordingly.

Figure 15:
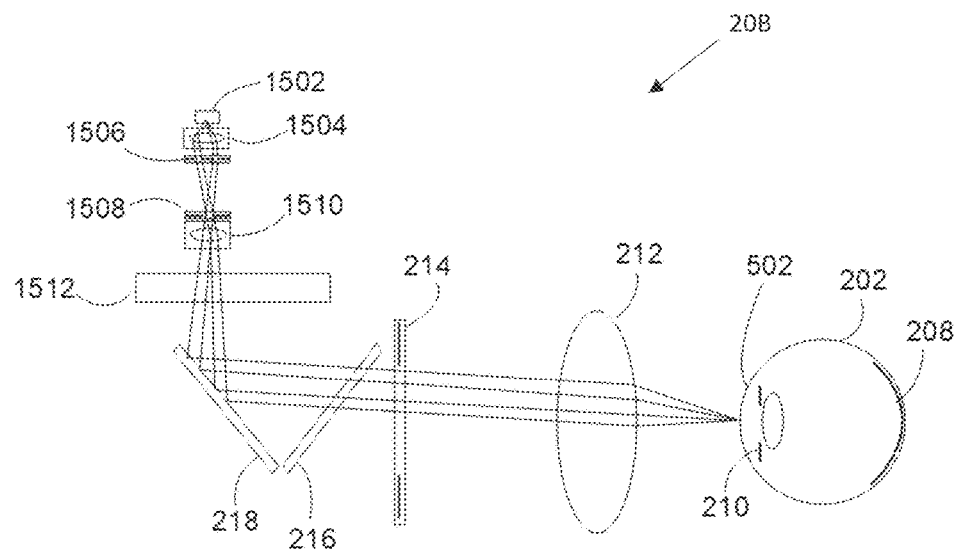
FIG. 15 illustrates an example of an alternative for a cornea alignment illumination.

FIG. 15 shows an alternative arrangement 2013 for the cornea xyz-aid illumination channel, where the second beamsplitter 218 may have partial reflection at near-infrared wavelengths below 900 nm.

The light from LED 1502 is collected by the condenser optics 1504 with one or more lenses, shaped by the field stop aperture 1506 and the illumination aperture stop 1508, and guided by a relay fifth optical arrangement 1510 including one or more lenses, by reflection from a fourth fold mirror 1512 and the second beamsplitter 218, through the first beamsplitter 216, the intermediate image aperture 214, and the objective lens 212 to the cornea 502 of the eye 202.

Target Channel

Figure 16:
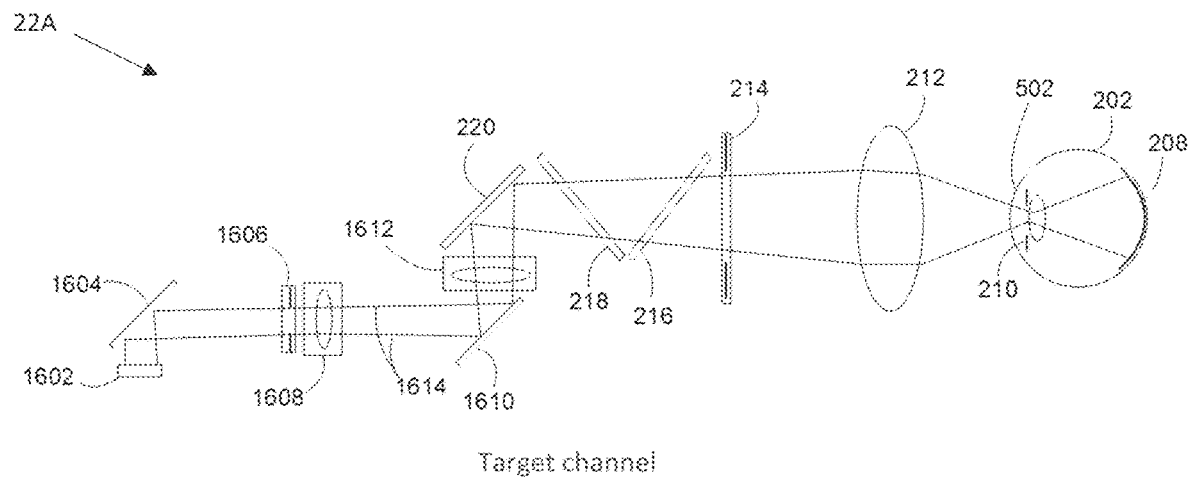
FIG. 16 illustrates an example of a target channel, which outputs and shows a video and/or at least one still image to a patient whose eye is under examination.

FIG. 16 shows the target channel 22A, which is used to output and show still and/or video image content to the patient whose eye 202 is under the examination. For example, fixation target spots can be shown to the patient so that the patient can align and keep his eye 202 in the desired gaze direction for the examination.

In an embodiment, the image content may be formed by a microdisplay 1602, which may be for example an OLED microdisplay. LCD, LCoS or DMD microdisplay can also be used with suitable illumination. Depending on the used microdisplay technology, the visible light emitted, reflected or transmitted from the microdisplay 1602, containing the image content, is collected through a fifth fold mirror 1604, the aperture stop 1606, to a sixth relay optical arrangement 1608, 1612 comprising at least one lens, which forms image of the content image through the reflection from a sixth fold mirror 1610 and the third beamsplitter 220, through the beamsplitters 218 and 216, close to the intermediate image aperture 214. The objective lens 212 generates a virtual image of the content to a suitable viewing distance from the eye 202 and guides the target channel beam 1614 through the eye pupil 210 forming real image of the content image at the retina 208. The suitable viewing distance may be infinity, for example, or the furthest distance the eye can accommodate.

The sixth relay optical arrangement 1608 and the seventh 1612 include at least one lens. The viewing distance may be adjusted by adjusting the optical distance between at least one lens of the sixth relay optical arrangement 1608 and a seventh relay optical arrangement 1612 and the microdisplay 1602. The adjustment may be manual or motorized.

The aperture stop 1606 is approximately imaged close to the eye pupil 210 when eye 202 is at the nominal eye position.

Figure 17:
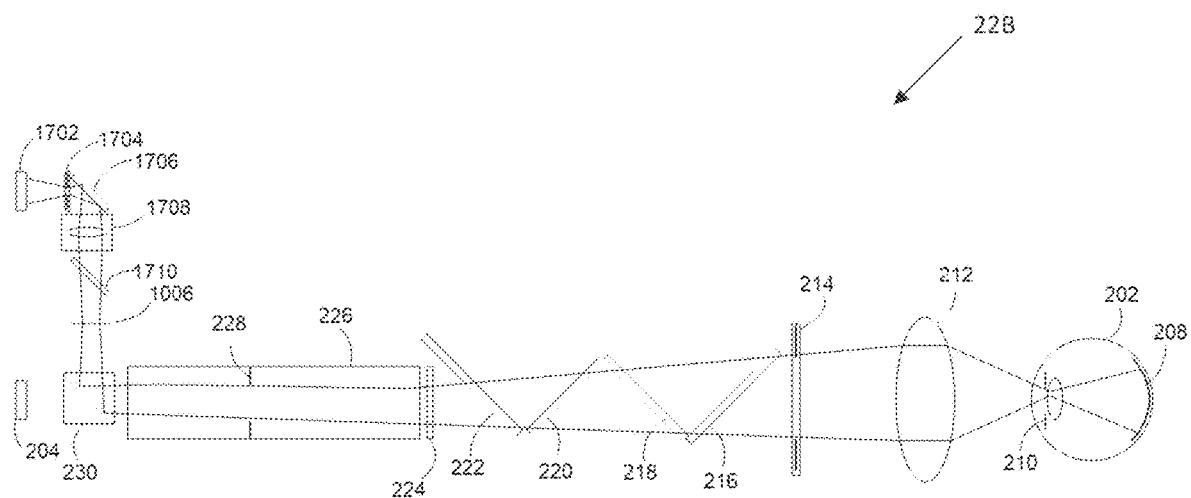
FIG. 17 illustrates an example of an alternative arrangement for the target channel with a beamsplitter.

FIG. 17 shows an alternative arrangement 228 for the target channel using the fifth beamsplitter 230 between the camera lens module 226 and the fundus camera sensor 204. The light from an image of the microdisplay 1702 is collected by the aperture stop 1704, reflected by a seventh fold mirror 1706, and imaged by a eighth relay optical arrangement 1708 with at least one lens, through an eight beamsplitter 1710, to the intermediate image 1006, from which the image is arranged to reflect from the fifth beamsplitter 230 towards the camera lens module 226, which images the image from the intermediate image 1006 to the retina 208 of the eye 202 through the imaging channel optical path. The fundus camera sensor 204 and the microdisplay 1702 are arranged to be optical conjugates. By that way, the image formed by the target channel is focused to the retina 208 at the same time when the retina 208 is focused to the fundus camera sensor 204. The aperture stop 1704 is also approximately at the conjugate of the aperture stop 228.

Figure 18:
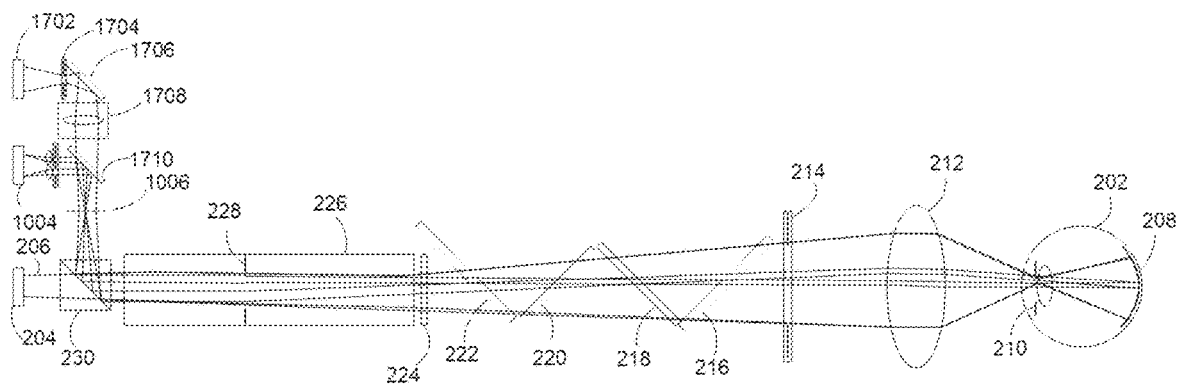
FIG. 18 illustrates an example of the target channel, the imaging channel and the phase detection auto-focus imaging channel.

FIG. 18 shows the same alternative target channel 22B with the above-described imaging channel and PDAF imaging channel. The microdisplay 1702, the PDAF sensor 1004 and the fundus camera sensor 204 may be arranged to the same circuit board. The second fold mirror 1002 in the above-described PDAF channel (see FIG. 10) is replaced by the eight beamsplitter 1710, which reflects near-infrared light and transmits visible light. The beamsplitter 230 may be arranged to divide both visible and near-infrared light between reflection and transmission in order to share both wavelength bands between all the three channels.

Pupil Illumination Channel

Figure 19:
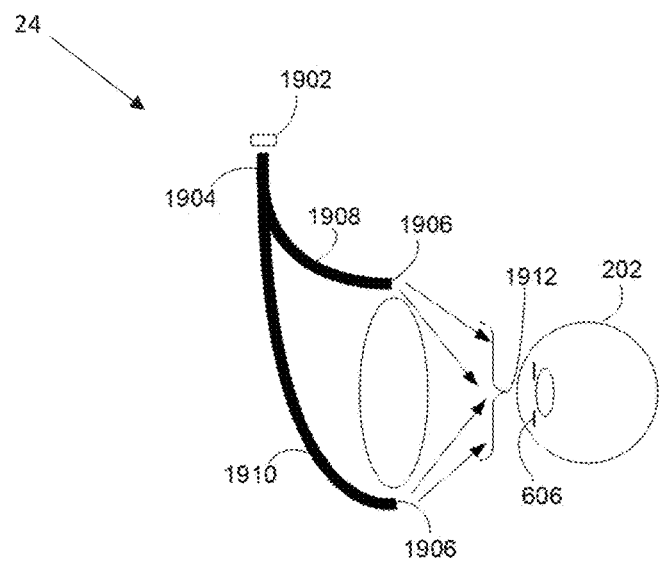
FIG. 19 illustrates an example of a pupil illumination channel.

FIG. 19 shows a pupil illumination channel 24. The purpose of the channel is to illuminate the front part of the eye 202, particularly the iris 606 of the eye, by near-infrared light, in order to be able to capture one or more images of the front part of the eye, and the iris 606, for example, for the purpose of aligning the fundus camera with the eye 202, and for the purpose of measuring the size of the iris 606 of the eye 202.

A LED 1902 emits near-infrared light. The light is coupled to a lightguide 1904, which guides the light to at least one lightguide output 1906, which is positioned close to the outer surface of the fundus camera housing next to the objective lens 212 and directed so that the front part of the eye 202 is illuminated with light 1912 when the eye 202 is in its nominal position. As shown in the FIG. 19, the lightguide 1904 may be splitted to two (or more) arms 1908, 1910, so that the eye 202 can be illuminated from two more) sides of the objective lens 212.

The wavelength band of the LED 1902 may be selected so that it differs from the wavelength bands of the channels allowed to propagate to the fundus camera sensor 204 so that the pupil illumination channel does not distort or cause image artifacts to the fundus camera sensor 204. For example, the NIR illumination channel may operate with dominating wavelength between about 840 nm and about 850 nm, for example, in which case the pupil illumination channel may operate for example with dominating wavelength between about 930 nm and about 950 nm, for example. The pupil illumination band may be separated from the imaging channel by using the second beamsplitter 218, which may reflect light having wavelength longer than about 900 nm and transmit light having wavelength shorter than or equal to about 900 nm. A shortpass filter blocking wavelengths longer than about 900 nm may be added to the imaging channel between the fundus camera sensor 204 and the second beamsplitter 218.

In an embodiment, there may be an additional optical component such as lens close to the lightguide outputs 1906, or the end part of the lightguide may be shaped suitably for directing the light from the lightguide outputs 1906 more efficiently to the needed area. An example of such arrangement is gradually increasing the diameter the lightguide for partially collimating the light, and tilting the output surface of the lightguide for bending light towards the iris of the eye 202.

First Pupil Camera Channel

Figure 20:
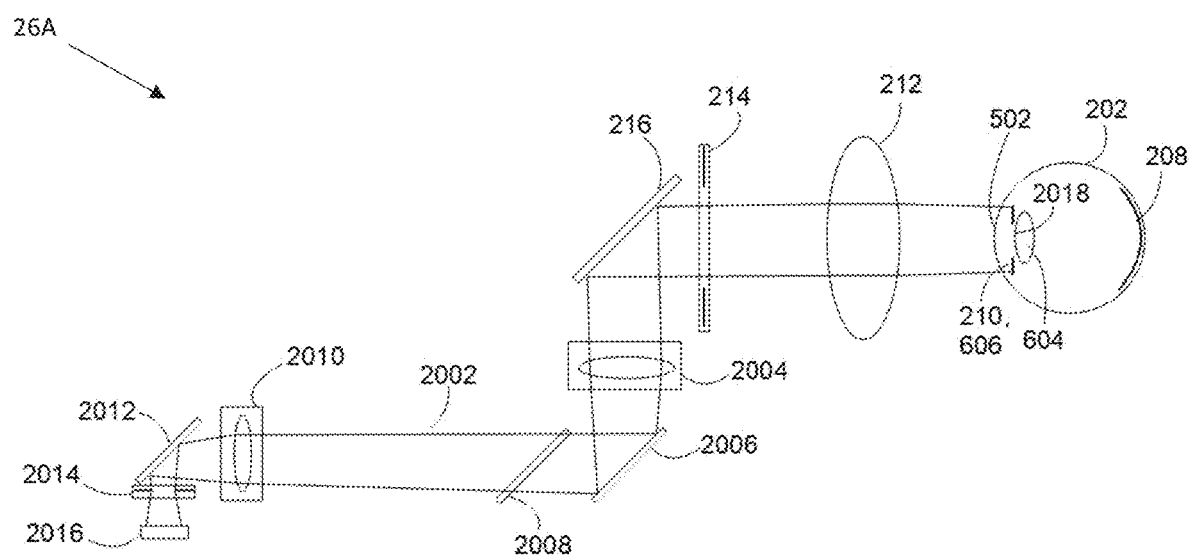
FIG. 20 illustrates an example of a pupil camera channel.

FIG. 20 shows a first pupil camera channel 26A, which is used to convey light from the anterior part of the eye 202 for capturing still images and/or video by a first pupil camera sensor 2016. Examples of the anterior parts of the eye include the iris 606 of the eye, the cornea 502 and/or the crystalline lens 604, for example. The pupil camera image can be used for aligning the fundus camera with the eye 202, or for example, for measuring the size of the iris aperture of the eye 202.

The pupil camera beam 2002 is formed when the near-infrared light reflects from the eye anterior, such as from the iris 606, gets collected by the objective lens 212 and reflects from the first beamsplitter 216 to a ninth relay optical arrangement 2004, gets reflected from an eight fold mirror 2006, and transmits through a ninth beamsplitter 2008 and a tenth relay optical arrangement 2010, reflects by a ninth fold mirror 2012, and transmits through the aperture stop 2014 to the first pupil camera sensor 2016. The first pupil camera sensor 2016 may be arranged to be approximately conjugate of for example the eye iris 606, the cornea 502, or the posterior surface 2018 of the crystalline lens 604 when the eye 202 is at its nominal position. The focus of the first pupil camera 2016 may be adjusted for example by adjusting axial position of at least one lens in the relay optical arrangements 2010 or 2004.

Second Pupil Camera Channel

Figure 21:
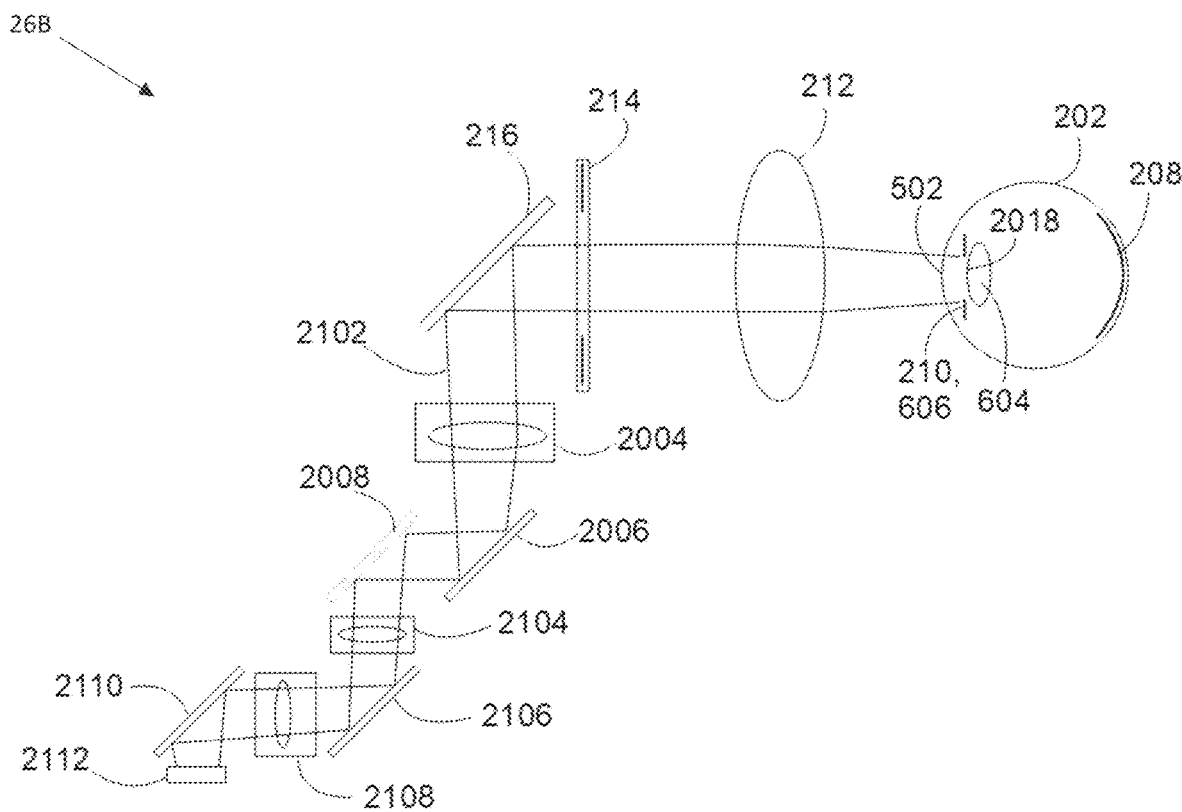
FIG. 21 illustrates an example of an alternative of the pupil camera channel.

FIG. 21 shows a second pupil camera channel 26B, which may be similar to the first pupil camera channel 26A and it can be used to capture images of the anterior part of the eye 202, The second pupil camera channel shares partially the same components as the first pupil camera channel 26A. After the eighth fold mirror 2006, the pupil camera beam 2102 reflects from the ninth beamsplitter 2008, transmits through an eleventh relay optic arrangement 2104, reflects from a tenth fold mirror 2106, transmits through the second relay optic arrangement 2108, reflects from a eleventh fold mirror 2110, to a second pupil camera sensor 2112. The eleventh relay optic arrangement 2104 may be removed by a suitable design of the ninth relay optic arrangement 2004 and a twelfth relay optic arrangement 2108. The focus of the second pupil camera 2112 may be adjusted for example by adjusting axial position of at least one lens in the relay optical arrangements 2004, 2104, or 2108.

Figure 22:
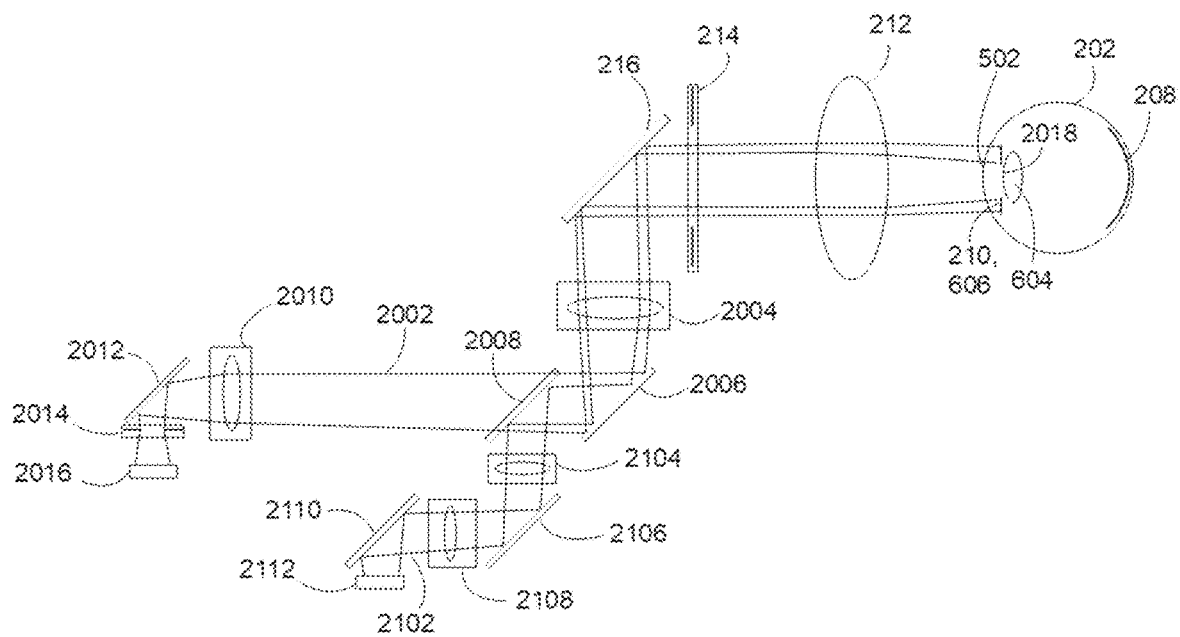
FIG. 22 illustrates an example of two pupil camera channels together.

FIG. 22 shows the first and second pupil camera channels 26A, 268 at the same time. The pupil camera beams 2002 and 2102 are combined by using the ninth beamsplitter 2008. Both of the pupil camera sensors 2016, 2112 may be in use at the same time as they may be focused to different distances, i.e. for example approximately to different surfaces of the eye anterior, which includes the cornea, the iris and the posterior surface of the crystalline lens, when eye 202 is at its nominal working, distance.

The pupil camera beams 2002 and 2102 may have a numerical aperture (NA) larger than about 0.1, or for example larger than about 0.15 on the eye anterior. These large NA's may provide a shorter depth-of-focus on the eye anterior, and so may provide a better accuracy for an optimal working distance determination. These large NA's may also provide a wide range for a possible gaze direction of the eye 202 during the working distance determination. These large NA's may also provide wide range for xy-alignment of the eye 202 during the working distance (z) determination.

Iris Spot z-Aid Illumination Channel

Figure 23:
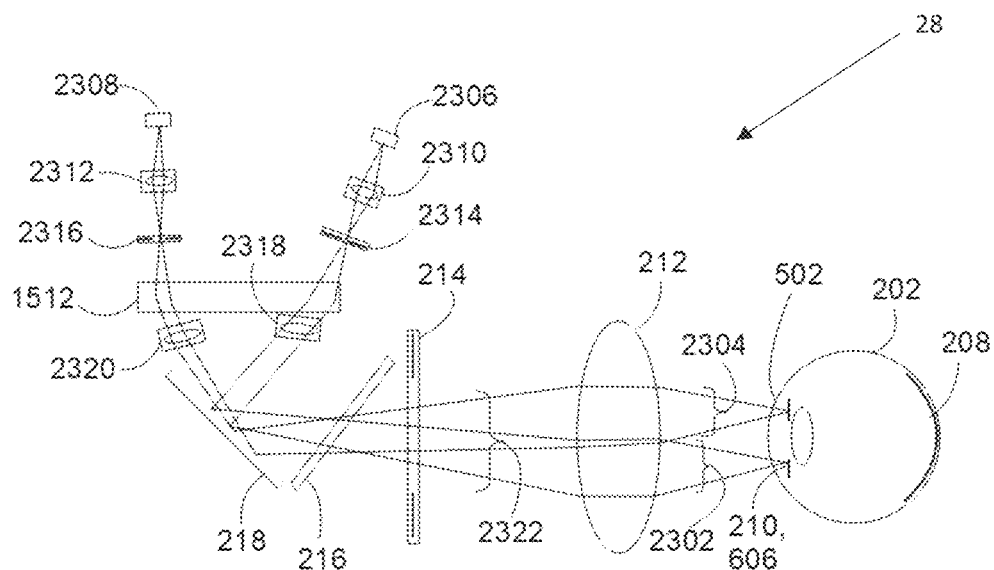
FIG. 23 illustrates an example of an iris spot of light of an alignment system of one-dimensional alignment in a z-axis.

FIG. 23 shows an iris spot z-aid illumination channel 28, comprising two sub-channels. The term "z-aid" refers to an alignment in a direction of distance between the eye 202 and the ophthalmic instrument, which is the z-axis of the optical system in general in this document. The LED 2306 and the LED 2308 emit near-infrared light which is collected by the collection optics 2310 and 2312 (respectively), both comprising at least one lens, to the field stop apertures 2314 and 2316 (respectively), which apertures 2314, 2316 are imaged to the iris 606 of the eye 202 when the eye 202 is at its nominal working distance. The light through the field stop apertures 2314 and 2316 is reflected by fourth fold mirror 1512, through thirteenth and fourteenth relay optical arrangements 2318 and 2320 (respectively), both comprising at least one lens, reflected by the second beamsplitter 218, transmitted through the first beamsplitter 216, the intermediate image aperture 214, and the objective lens 212, to the iris 606 of the eye 202. The iris spot z-aid illumination beam 2322 includes two sub-beams: the iris spot z-aid illumination sub-beam 2302 and the iris spot z-aid illumination sub-beam 2304. Using only one sub-beam is also possible. It is also possible to use more than two sub-beams.

Figure 24:
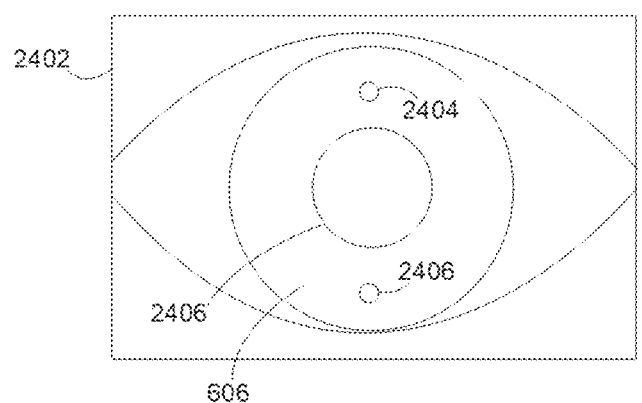
FIG. 24 illustrates an example of an image of the iris with two spots of light.

FIG. 24 shows the image 2402 of the iris 606 of the eye 202 with the two spots, spot 2404 and spot 2406, formed by the two sub-beams 2302, 2304, as may be imaged by at least one of the pupil camera channels 26A and/or 26B on one of the pupil camera sensors 2016, 2112. The sharpness and/or the form of the spots 2404, 2406 at the iris 606 may be used to determine the axial distance of the eye 202 to the fundus camera, as well as size and position of the eye iris aperture 2406.

Instead of the spots 2404, 2406, the iris spot z-aid illumination channel 28 may project any other shape, such as one or more lines, crosses, circles, or any patterns on the iris 606. The changes in the projected shape, for example changes in sharpness, form, or location, can be observed by at least one of the pupil camera sensors 2016, 2112, for determining at least one of: the optimal working distance (z) to the eye 202, the xy-position of the iris 606, and the size of the iris 606 for enabling the optimal imaging conditions for the fundus camera.

Cornea Spot z-Aid Illumination Channel

Figure 25:
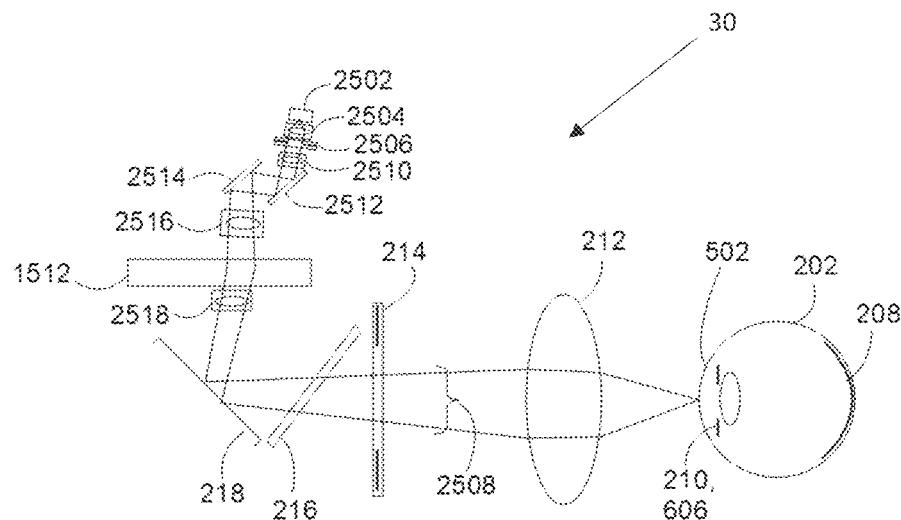
FIG. 25 illustrates an example of a light spot on the cornea formed by a z-aid illumination channel.

FIG. 25 shows the cornea spot z-aid illumination channel 30, which is used to form a spot or line or some other clear pattern to the surface of the cornea 502 when eye 202 is at the nominal working distance. The sharpness and/or the form of the cornea 502 reflected spot is observed by one of the pupil camera channels, from which the axial distance of the cornea 502 to the fundus camera may be determined.

The LED 2502 emits near-Infrared light which is collected by the condenser optics 2504 consisting at least one lens and shaped by the field stop aperture 2506 to form the desired pattern such as line. After the field stop aperture 2506, the cornea spot z-aid illumination beam 2508 propagates through a fifteenth relay optics 2510, reflects from a twelfth fold mirror 2512, reflects from a tenth beamsplitter 2514, propagates through a sixteenth relay optical arrangement 2516, reflects from the fourth fold mirror 1512, propagates through a relay optical arrangement 2518, reflects from the second beamsplitter 218, propagates through the first beamsplitter 216, the intermediate image aperture 214, and the objective lens 212, to the cornea 502 of the eye 202.

The LED 2502 may for example emit light with dominant wavelength approximately between 930 and 960 nm. Each of the relay optic arrangements 2510, 2516, and 2518 are not necessarily needed by suitable choice of lenses of remaining relay optic arrangements.

The cornea spot z-aid illumination beam 2508 may have NA larger than 5 about 0.1, or for example larger than about 0.15 on the cornea. These large NA's may provide a shorter depth-of-focus, and so may provide a better accuracy for optimal working distance determination. These large NA's may provide a looser angular tolerance for the eye gaze direction during optimal working distance determination. These large NA's may also provide wide range for xy-alignment of the eye 202 during the working distance (z) determination. A least one of the following is configured to receive reflections of the cornea spot z-aid illumination channel from the cornea 502: the first or second pupil camera sensor 2016, 2112.

Posterior Spot z-Aid Illumination Channel

Figure 26:
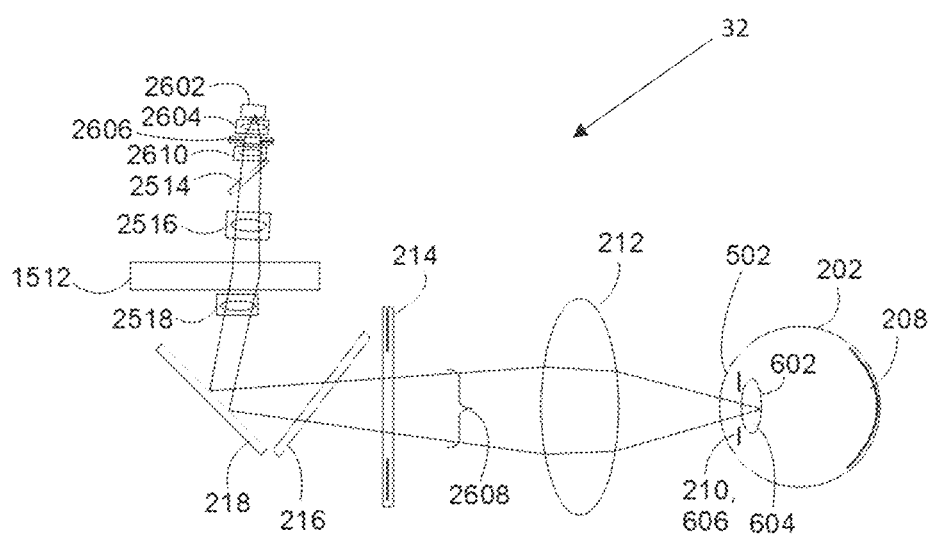
FIG. 26 illustrates an example of a posterior spot of light of the z-aid illumination channel on a posterior surface of a crystalline lens in a direction of propagation of illumination light.

FIG. 26 shows the posterior spot z-aid illumination channel 32, which resembles the cornea spot z-aid illumination channel. The posterior spot z-aid illumination is used to form a spot or line (or some other pattern) at the posterior surface 602 of the crystalline lens 601 when eye 202 is at the nominal working distance. The sharpness and/or the form of the surface reflected spot is observed by at least one of the pupil camera channels 26A, 268, from which the axial distance of the surface 602 to the fundus camera may be determined.

The LED 2602 emits near-Infrared light which is collected by the condenser optic arrangement 2604 with at least one lens and shaped by the field stop aperture 2606 to form the desired pattern such as line, for example. After the field stop aperture 2606, the posterior spot z-aid illumination beam 2608 propagates through a eighteenth relay optic arrangement 2610, the tenth beamsplitter 2514, the sixteenth relay optic arrangement 2516, reflects from the fourth fold mirror 1512, propagates through the seventeenth relay optic arrangement 2518, reflects from the second beamsplitter 218, propagates through the first beamsplitter 216, the intermediate image aperture 214 and the objective lens 212, inside the eye 202 to the posterior surface 602 of the crystalline lens 604.

The LED 2602 may for example emit light with dominant wavelength approximately between about 930 nm and about 960 nm, for example. Each of the relay optic arrangements 2606, 2516, and 2518 are not necessarily needed by suitable choice of lenses of remaining relay optic arrangement.

Figure 27:
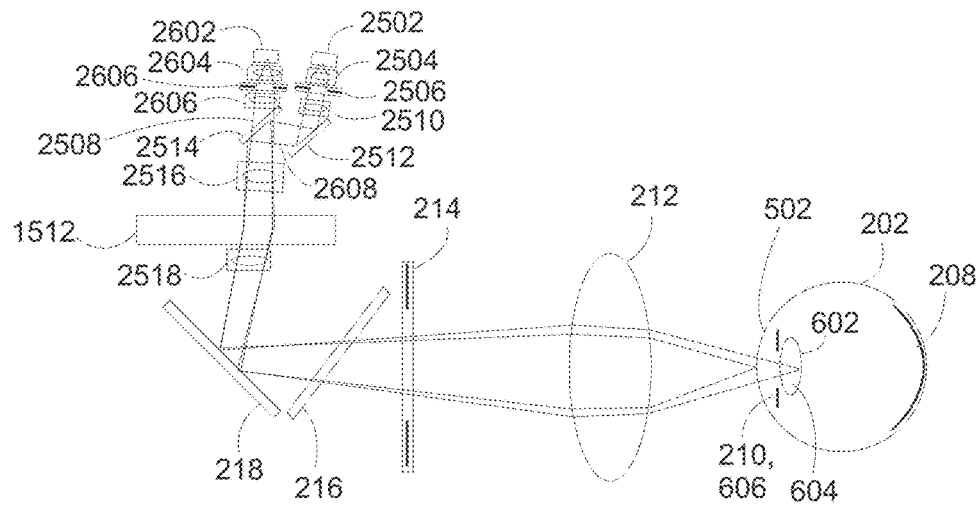
FIG. 27 illustrates an example of a cornea spot z-aid channel and the posterior spot illumination channel.

FIG. 27 shows the cornea spot z-aid illumination channel together with the posterior spot illumination channel. The cornea spot z-aid beam 2508 and the posterior spot z-aid beam 2608 are combined by using the tenth beamsplitter 2514.

The posterior spot z-aid illumination beam 2608 may have NA larger than about 0.1, or for example larger than about 0.15 on the eye anterior. These large NA's may provide shorter depth-of-focus, and so may provide a better accuracy for optimal working distance determination. These large NA's may provide looser angular tolerance for the eye gaze direction during the optimal working distance determination. These large NA's may also provide a wide range for xy-alignment of the eye 202 during the working distance (z) determination.

First Pupil Camera Channel Variant

Figure 28:
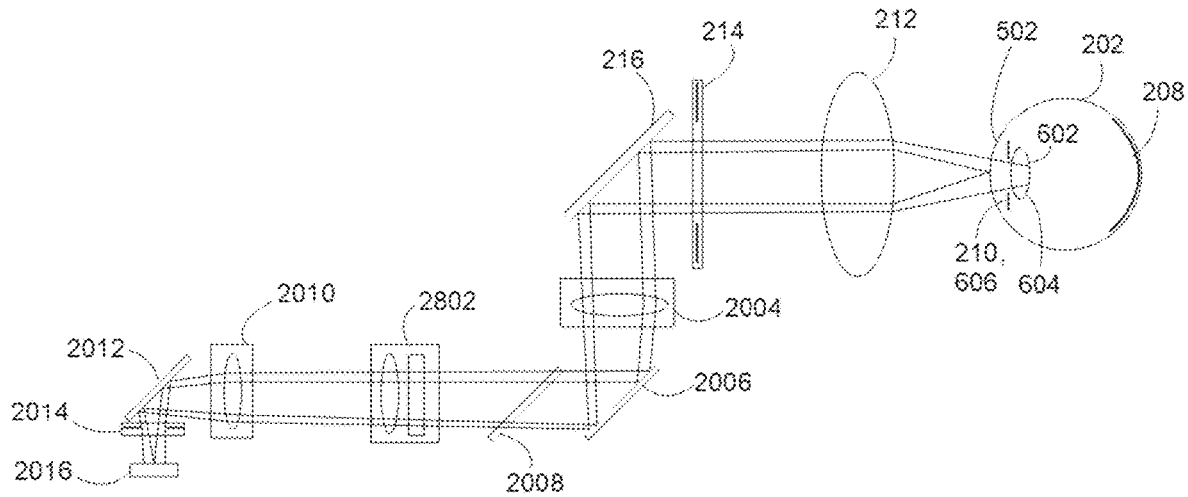
FIG. 28 illustrates an example of a variant of the pupil camera channel for imaging the eye.

FIG. 28 shows a variant of the first pupil camera channel 26A, which is configured to image the eye 202 based on reflections of the cornea spot z-aid illumination channel and from the posterior spot z-a id illumination channel at the same time. The both illumination channels image narrow slit (at field stop apertures) to the corresponding eye 202 surfaces, i.e. to the cornea 502 and to the posterior surface 602 of the crystalline lens 604, so that the line-shaped images of the slits are perpendicular to each other. An astigmatic relay optic arrangement 2802, whose cylindric axis match with the line orientations, is added to the first pupil camera channel so that the both lines can be focused from the cornea 502 and the posterior surface 602 of the crystalline lens 604 to the first pupil sensor 2016 at the same time when eye 202 is at its nominal position. The astigmatic relay optic arrangement 2802 includes at least one cylindrical lens, or for example two cylindrical lenses as shown in FIG. 28.

Second Pupil Camera Channel Variant

FIG. 28 shows a variant of the second pupil camera channel 26B, which is capable of imaging the eye 202 based on reflections of the cornea spot aid illumination channel and of the posterior spot z-aid illumination channel at the same time, Both of illumination channels image narrow slit (at field stop apertures) to the corresponding eye 202 surfaces, i.e. to the cornea 502 and to the posterior surface 602 of the crystalline lens 604, so that the line-shaped images of the slits are perpendicular to each other. An astigmatic relay optic arrangement 2802, whose cylindric axis match with the line orientations, is added to the second pupil camera channel so that the both lines can be focused from the cornea 502 and the posterior surface 602 of the crystalline lens 604 to the second pupil sensor 2016 at the same time when eye 202 is at its nominal position. The astigmatic relay optics 2802 consist of at least one cylindrical lens, or for example two cylindrical lenses as shown in FIG. 28.

Note that in addition to the presented exemplary channel and wavelength configurations, channels and their wavelengths may be configured otherwise too, by selecting beamsplitters transmission and reflection spectra accordingly, by possibly adding bandpass filters, and by using time-domain multiplexing in sensor when multiple channels are captured by the same sensor and different channels need to be captured separately.

Several different combinations of spectral bands for different channels can thus be advantageously enabled.

In any embodiment, when the optimal working distance between the eye and the ophthalmic apparatus has not been reached, the image of the cornea may be out-of-focus and/or obscure. However, a proper alignment can still be reached, and in response to the successful alignment an accurate and properly focused image and/or a video of the fundus can be captured.

The embodiments bring advantages. An advantage of using the first pupil camera channel 26A is that it may help determining the optimal working distance and/or the optimal lateral alignment with the eye 202 for fundus imaging. An advantage of using the second pupil camera channels 26B is that it may help determining the optimal working distance and/or the optimal lateral alignment with the eye 202 for fundus imaging. An advantage of using the first pupil camera channel 26A and/or the second pupil camera channel 26B is that they may help determining the optimal working distance and/or the optimal lateral alignment with the eye 202 for fundus imaging, without need of change of focus of the fundus camera sensor 204 from the retina 208 to the anterior part of the eye 202.

An advantage of the described phase detection auto-focus illumination channel 18 combined with the described phase detection auto-focus imaging channel 10 is that the optimal focus for a camera tens module 226 may be determined rapidly and accurately.

An advantage of configuring the first pupil camera channel 26A or the second pupil camera channel 268 to image the eye 202 based on reflections of light of the cornea spot z-aid illumination channel 30 from the cornea 502 and light of the posterior spot z-aid illumination channel 32 from the posterior surface 602 of the crystalline lens 604 at the same time is that only one sensor may be needed instead of two sensors for capturing these light beams.

An advantage of the described fundus camera, and the described channels, is that they allow the fundus camera to be hand-held and portable.

An advantage of the described fundus camera, and the described channels, is that they allow the fundus camera to be light, small-size, and relatively low-cost.

An advantage of the described fundus camera, and the described channels, is that they enable imaging of the fundus of patients with different eye geometries by good image quality and with minimal amount of image artifacts such as reflections.

An advantage of the described fundus camera, and the described channels, is that they enable imaging of the fundus of patients through small eye iris 606 without need of pupil dilation.

An advantage of the described fundus camera, and the described channels, is that they enable imaging of the different areas of the retina 208 with good image quality.

Figure 29:
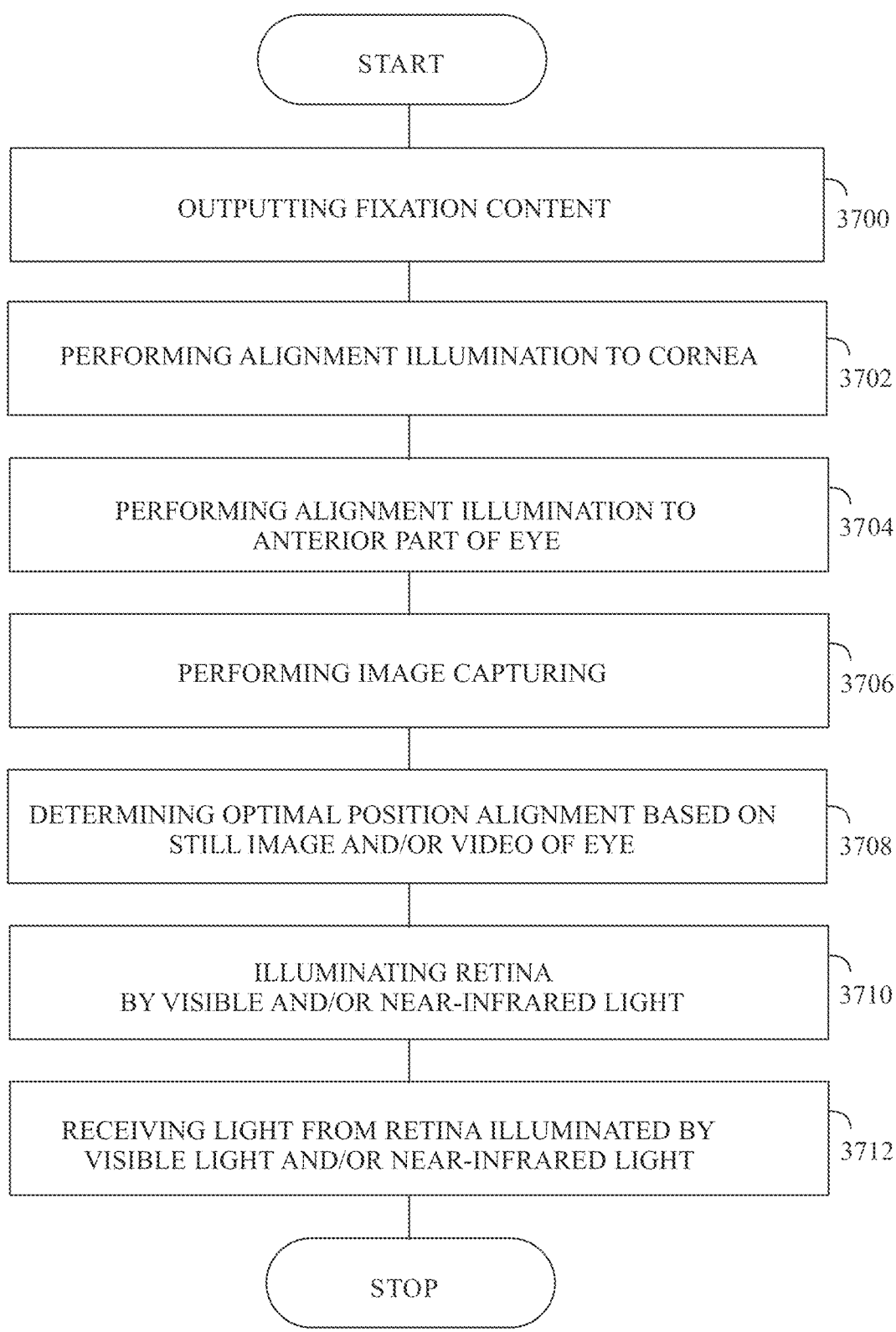
FIG. 29 illustrates an example of a flow chart of an operating method.

FIG. 29 is a flow chart of the measurement method. In step 3700, fixation image content to a patient whose eye 202 is under the examination is output by a target channel 22A, 228, for fixation of a gaze direction of the patient.

In step 3702, at least one of the following illuminations to a cornea 502 for alignment, are performed: directing cornea xyz-aid illumination beams 1402 of infrared light from a cornea xyz alignment arrangement 20A to the cornea 502, and directing near-infrared alignment beams from a cornea spot illumination z-aid channel 30 to the cornea 502, the cornea xyz alignment arrangement 20A being an operational pair with the fundus camera sensor 204 that captures at least one still image and/or video of the cornea 502 under illumination of infrared light of the cornea xyz alignment arrangement 20A.

In step 3704, at least one of the following illuminations to the anterior part of the eye 202 are performed: directing by near-infrared alignment beams from an iris spot z-aid illumination channel 28 to the iris 606, and directing near-infrared alignment beams from a posterior spot z-aid illumination channel 32 to a posterior surface 602 of the crystalline lens 604.

In step 3706, image capturing is performed in at least one of the following ways for capturing 3708 at least one still image and/or video of the anterior part of the eye 202 by a pupil camera sensor 2016 or a second camera sensor 2112: conveying, by a first pupil camera channel 26A, light from the anterior part of the eye 202 to the first pupil camera sensor 2016, and conveying, by a second pupil camera channel 26B, light from the anterior part of the eye 202 to the second camera sensor 2112.

In step 3708, an optimal positional alignment of the eye 202 is determined by a data processing unit 2000 for imaging a fundus of the eye 202 by the fundus camera sensor 204 based on the at least one still image and/or video the cornea 502 and at least one of the following captured by either of the first or second pupil camera sensor 2016, 2112, the iris 606 and the posterior surface 602 of the crystalline lens 604. In step 3710, a retina 208 of the eye 202 of the patient under examination is illuminated using visible light by a visible light illumination channel 12 and/or near-infrared light by a near-infrared illumination channel 14.

In step 3712, light from the retina 208 of the eye 202 illuminated by the visible light and/or the near-infrared light is received by an imaging channel 10. The imaging channel 10 forms or guides the light for a formation of a still image or a video of the retina 208 based on visible light and/or near-infrared light, the still image and/or the video being output through a display or screen of the user interface 2006, for example, for examination of the retina 208.

The method shown in FIG. 29 may be implemented as a logic circuit solution or computer program. The computer program may be placed on a computer program distribution means for the distribution thereof. The computer program distribution means is readable by a data processing device, and it encodes the computer program commands, carries out the measurements and optionally controls the processes on the basis of the measurements.

The computer program may be distributed using a distribution medium which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

What is claimed is:

1. An ophthalmic apparatus, wherein the ophthalmic apparatus comprises
    a visible light illumination channel, which is configured to illuminate a retina of an eye of a patient under examination by visible light, and/or a near-infrared illumination channel, which is configured to illuminate the retina of the eye of the patient under examination by near-infrared light;
    an imaging channel, which is configured to receive light from the retina of the eye illuminated by the visible light and/or the near-infrared light;
    a target channel, which is configured to output fixation image content to a patient whose eye is under the examination for fixation of a gaze direction of the patient;
    a fundus camera sensor;
    at least one of the following illumination alignment arrangement associated with a cornea: a cornea spot illumination z-aid channel configured to generate near-infrared alignment beam directed to the cornea, and a cornea xyz alignment arrangement configured to generate cornea xyz-aid illumination beams of infrared light, the cornea xyz alignment arrangement being an operational pair with the fundus camera sensor that is configured to capture at least one still image and/or video of a reflection of infrared light of the cornea xyz alignment arrangements on the cornea;

at least one of the following illumination alignment arrangement associated with the anterior part of the eye: an iris spot z-aid illumination channel, which is configured to generate near-infrared alignment beam directed to the iris, and a posterior spot z-aid illumination channel, which is configured to generate near-infrared alignment beam directed to a posterior surface of the crystalline lens;

at least one of the following camera channel arrangements: a first pupil camera channel, which is configured to convey light from the anterior part of the eye for capturing of at least one still image and/or video by a first pupil camera sensor, and a second pupil camera channel for image capturing of the anterior part of the eye by a second pupil camera sensor; and a data processing unit, which is configured to determine an optimal positional alignment of the eye for imaging a fundus of the eye by the fundus camera sensor based on the at least one still image and/or video of the reflection on the cornea and at least one of the following captured by either of the first or second pupil camera sensor: the reflection of the alignment beam on the iris and the reflection of the alignment beam on the posterior surface of the crystalline lens.

2. The apparatus of claim 1, wherein the imaging channel is configured convey light from the retina of the eye to a fundus camera sensor for capturing still images and/or video of the retina.

3. The apparatus of claim 1, wherein the ophthalmic apparatus comprises a phase detection auto-focus illumination channel and a phase detection auto-focus imaging channel, data processing unit is configured to determine a focus for a camera lens module of the imaging channel based on information from the phase detection auto-focus imaging channel.

4. The apparatus of claim 1, wherein the target channel is configured to output still and/or video image content to the patient whose eye is under the examination.

5. The apparatus of claim 1, wherein
the fundus camera sensor is configured to form images of the visible light and/or the infrared light reflected from the at least one of the following based on illumination: the retina and the cornea.

6. The apparatus of claim 1, wherein the cornea xyz-aid illumination channel is configured to form alignment beams to be reflected from the cornea, and a reflection of the alignment beams are conveyed through the imaging channel for capture of an image or a video by the fundus camera sensor.

7. The apparatus of claim 1, wherein at least one of the following is configured to receive reflections of the cornea spot z-aid illumination channel from the cornea: the first or second pupil camera sensor.

8. The apparatus of claim 1, wherein the alignment arrangement comprises a pupil illumination channel, which is configured to illuminate an iris of the eye by near-infrared light, and at least one image and/or video of the iris under illumination of the pupil illumination channel is captured by at least one of the first pupil camera sensor and the second pupil camera sensor.

9. The apparatus of claim 1, wherein in the first pupil camera channel is configured to image the eye based on reflections of light of the cornea spot z-aid illumination channel from the cornea and light of the posterior spot z-aid illumination channel from the posterior surface of the crystalline lens at the same time.

10. The apparatus of claim 1, wherein the second pupil camera channel for imaging the eye is based on reflections of light of the cornea spot z-aid illumination channel from cornea and of the posterior spot z-aid illumination channel from the posterior surface of the crystalline lens at the same time.

* * * * *